US008681093B2

(12) United States Patent
Lee et al.

(10) Patent No.: US 8,681,093 B2
(45) Date of Patent: Mar. 25, 2014

(54) MOTION COMPENSATION FOR SCREENS

(75) Inventors: Michael M Lee, San Jose, CA (US);
Mason R Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1275 days.

(21) Appl. No.: 12/029,336

(22) Filed: Feb. 11, 2008

(65) Prior Publication Data
US 2009/0201246 A1  Aug. 13, 2009

(51) Int. Cl.
*G09G 5/00* (2006.01)

(52) U.S. Cl.
USPC .......................................... 345/156

(58) Field of Classification Search
None
See application file for complete search history.

(56) References Cited

U.S. PATENT DOCUMENTS

| | | | | |
|---|---|---|---|---|
| 5,565,894 A * | 10/1996 | Bates et al. | ................... | 345/178 |
| 6,317,114 B1 * | 11/2001 | Abali et al. | ................... | 345/672 |
| 6,906,754 B1 | 6/2005 | Yerazunis et al. | | |
| 6,977,646 B1 | 12/2005 | Hauck et al. | | |
| 7,154,483 B2 * | 12/2006 | Kobayashi | ................... | 345/173 |
| 7,158,122 B2 | 1/2007 | Roberts | | |
| 7,401,300 B2 * | 7/2008 | Nurmi | ................... | 715/866 |
| 7,861,166 B1 * | 12/2010 | Hendricks | ................... | 715/277 |
| 2005/0154798 A1 * | 7/2005 | Nurmi | ................... | 710/1 |
| 2006/0097991 A1 * | 5/2006 | Hotelling et al. | ................... | 345/173 |
| 2007/0127903 A1 * | 6/2007 | Nomura et al. | ................... | 396/52 |
| 2007/0236475 A1 * | 10/2007 | Wherry | ................... | 345/173 |
| 2009/0040179 A1 | 2/2009 | Lee et al. | | |
| 2010/0231526 A1 | 9/2010 | Kawabata | | |

FOREIGN PATENT DOCUMENTS

| | | |
|---|---|---|
| JP | 2007-219892 A | 8/2007 |
| KR | 10-0339175 | 6/2002 |
| KR | 10-2004-0064291 A | 7/2004 |
| KR | 10-2004-0076925 A | 9/2004 |
| KR | 10-2004-0111634 A | 12/2004 |
| KR | 10-0758288 B1 | 9/2007 |

OTHER PUBLICATIONS

Korean Search Report dated Sep. 27, 2010 from related Korean Application No. 10-2010-07020313 (8 pgs.).

* cited by examiner

*Primary Examiner* — William Boddie
*Assistant Examiner* — Carolyn R Edwards
(74) *Attorney, Agent, or Firm* — Morgan, Lewis & Bockius LLP

(57) ABSTRACT

A method for compensating for motion on screens is provided. In one embodiment, the method includes varying the display of a screen on a device using motion data. In this embodiment, a display adjustment amount also may be determined using screen properties and motion limits. In another embodiment, the method includes varying the location of an input region on a touch screen using touch data. In yet another embodiment, the method includes scaling selectable images and apportioning the display using motion data. Various additional methods, machine-readable media, and systems for motion compensation of a screen are also provided.

6 Claims, 16 Drawing Sheets

MOTION COMPENSATION FOR SCREENS

BACKGROUND OF THE INVENTION

1. Field of the Invention

The present invention relates generally to electronic devices and, more particularly to the adjustment of display screens and touch screens.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Electronic devices and systems increasingly include screens as part of the user interface of the device or system. The screens may include a display screen for displaying information about the status of a system or a device. For example, portable media players may display information about a music or video file being played by the device, such as the title, the time elapsed, or the artist or cast. In addition to a display screen, the screens may include a touch screen for receiving user input for controlling the system or device. For example, a portable data device may display selectable icons allowing a user to navigate to applications such as a calendar, phone book, music player, or web browser.

As may be appreciated, screens may be employed in a wide variety of devices and systems, including desktop computer systems, notebook computers, monitoring systems, control systems, handheld computing devices, and various consumer products, such as cellular telephones and portable media players. Furthermore, the devices and systems may be used in environments which, or by users who, produce screen instability. For example, the screen may be part of a system used in a high vibration environment such as a tank monitoring and control system for a chemical processing plant or a personal entertainment system located within an airplane seat back. Similarly, the screen may be part of a portable electronic device that is accessed in an unsteady environment such as a subway or moving vehicle. In another example, the screen may be part of a device used by a user with limited or impaired motor control.

The instability, whether produced by the environment or the user, may cause user interface challenges. For example, a vibrating screen may make it difficult for a user to view images on the screen. Similarly, a moving screen or input object may make it difficult for a user to select an item on a touch screen.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

The present disclosure generally relates to techniques for compensating for motion on screens such as display screens and touch screens. In accordance with one disclosed embodiment, an exemplary method may include varying a display screen to compensate for motion of a device. In some embodiments, the display adjustment amount may be determined using motion data and screen properties. In other embodiments, an exemplary method may include scaling selectable images on a display screen to compensate for motion of a device. In accordance with another disclosed embodiment, an exemplary method may include varying an input region on a touch screen to compensate for motion of the selection object. In some embodiments, the input region adjustment amount may be determined using touch data including pressure values and location values. Additionally, some embodiments may compensate for both motion of a device and motion of a selection object by varying both the display screen and the input regions.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
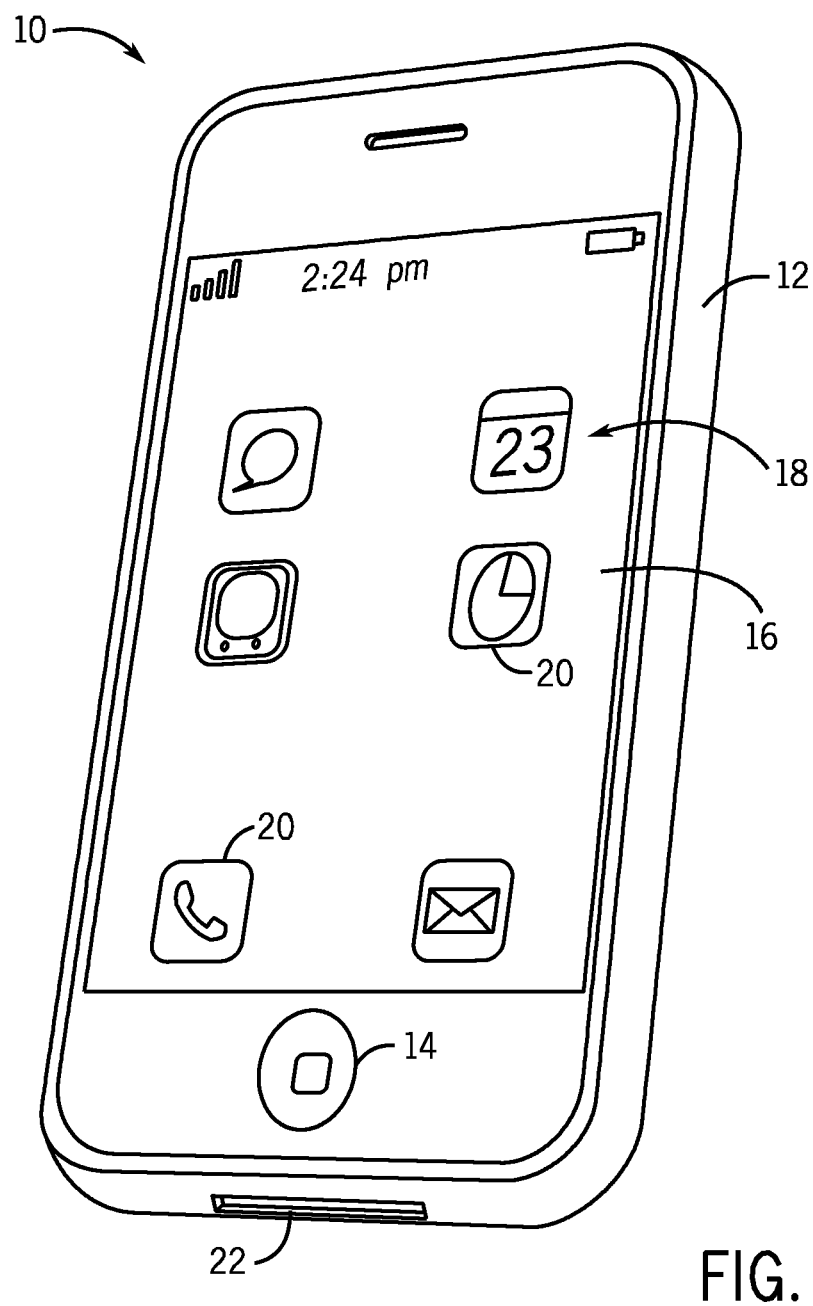
FIG. 1 is a perspective view illustrating an electronic device in accordance with one embodiment of the present invention.

FIG. 1 illustrates an electronic device 10 in accordance with one embodiment of the present technique. As illustrated in FIG. 1, the electronic device 10 may be a portable media device such as an iPod® or iPhone® available from Apple Inc. However, the presently disclosed techniques may be applicable to a variety of other electronic devices such as computers, data devices, cellular telephones, or any other processor based device employing one or more screens. The screens may be display screens, touch screens, or any combination thereof. Additionally, the devices may be used independently or as part of a system such as an industrial control system or alarm monitoring system.

In the depicted embodiment, the device 10 is enclosed by a casing 12 that protects the interior components from physical damage and shields them from electromagnetic interference. The casing may be formed from any suitable material such as plastic, metal, or a composite. The casing allows access to a user input structure 14 through which a user may interface with the device. For example, the user input structure 14 when pressed may cause a "home" menu to be displayed on the device. In other embodiments, multiple user input structures may be present that are configured to produce various actions such as controlling the volume, power, and menu navigation for the device. The user input structures may exist in various forms including buttons, switches, control pads, keys, knobs, scroll wheels, or other suitable forms.

The device 10 also includes a display 16 which may display various screens 18 generated by the device. The screens 18 may include collections of images 20, such as icons, photos, movies, album art, and/or data, such as text documents, spreadsheets, text messages, and email, among other things. In other embodiments, such as systems used in industrial settings, the display may show screens containing images such as process settings, control charts, or other system properties. The screens 18 also may incorporate system indicators that provide feedback to a user, such as power status, signal strength, call status, memory status, or the like. Furthermore, the screens 18 may be used to display a user interface, such as a command line interface (CLI) or a graphical user interface (GUI) that allows a user to interact with the device through a user input structure, such as a keyboard or mouse, or other method, such as a touch screen.

The display 16 may be a standalone unit or it may be integrated within the device 10. For example, the display 16 may be a separate monitor coupled to a processor via a wireless or cable connection. In other embodiments, such as the embodiment illustrated in FIG. 1, the display 16 may be integrated within the casing 12 of the device 10. The display 16 may be any type of display such as a liquid crystal display (LCD), a light emitting diode (LED) display, an organic light emitting diode (OLED) display, or other suitable display. Additionally, the display 16 may include an integrated touch screen or may be configured to interact with an independent touch screen.

An input and output (I/O) port 22 may be included on the exemplary device 10 to allow connection of additional devices. For example, the port may be used to connect headphones, a power source, a printer, or a computer. In other embodiments, multiple ports may be included on a device. The ports may be any interface type such as a universal serial bus (USB) port, Firewire port, IEEE-1394 port, or AC/DC power connection port.

Figure 2:
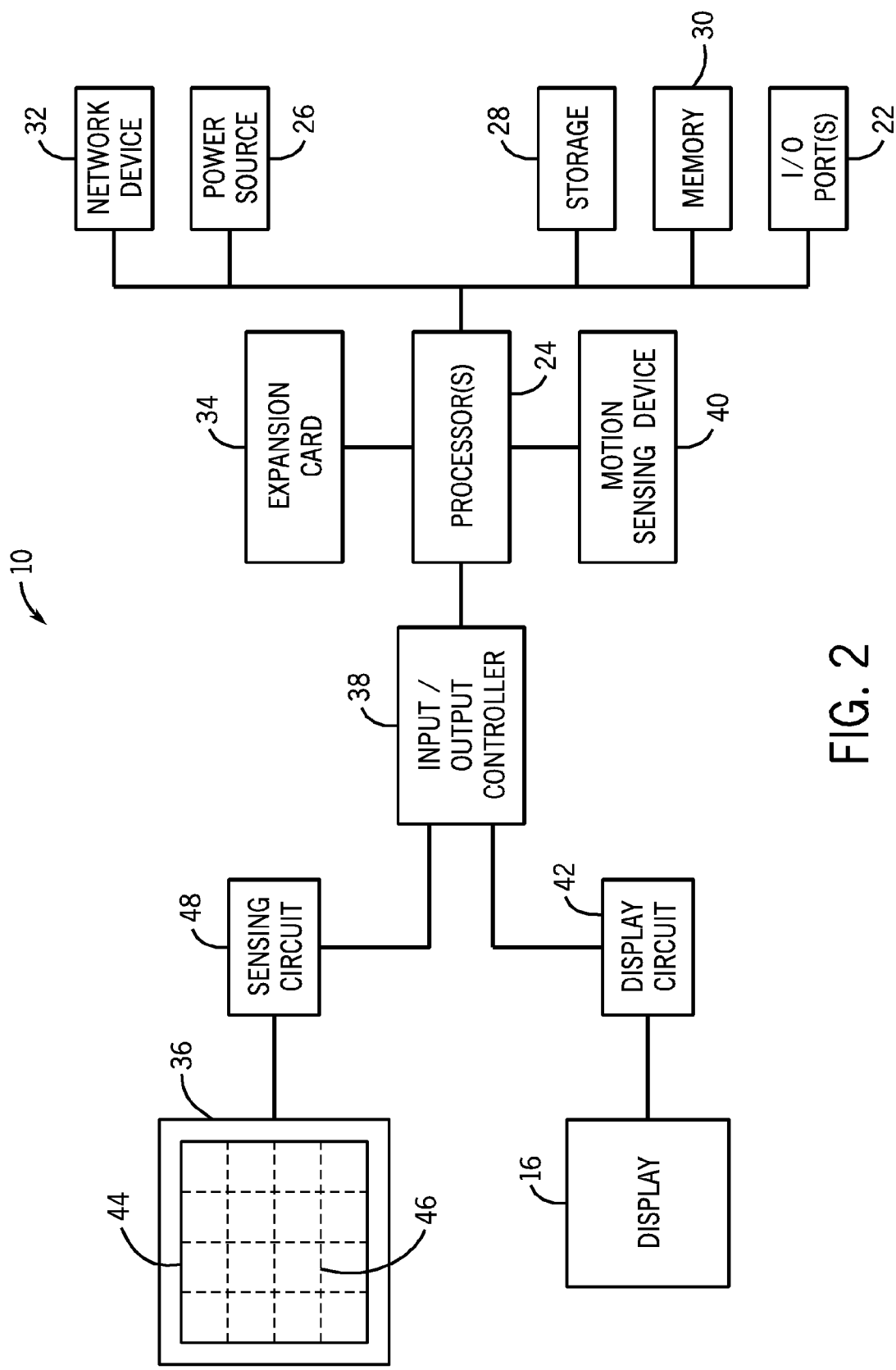
FIG. 2 is a simplified block diagram of the device of FIG. 1 in accordance with one embodiment of the present invention.

Additional details of the illustrative device 10 may be better understood through reference to FIG. 2, which is a block diagram illustrating various components and features of the device 10 in accordance with one embodiment of the present invention. The block diagram includes the display 16 and the I/O port 22 discussed above, as well as many other components.

The operation of the device 10 may be controlled by one or more processor(s) 24 that provide the processing capability required to execute the operating system, programs, user interface, and any other functions of the device 10. The processor(s) 24 may include one or more microprocessors configured to execute instructions and carry out computer system operations such as executing the operating system, programs, and the user interface. The processor(s) 24 may include general purpose microprocessors and/or special purpose microprocessors. For example, the processor(s) may include one or more reduced instruction set computer (RISC) processors, such as an ARM Core Processor, as well as graphics processors, video processors, and related chip sets.

The device 10 may be powered by a power source 26 that may include one or more batteries and, or alternatively, an AC power source, such as provided by an electrical outlet. In other embodiments, an AC or DC power source may be directly wired to the device 10 through a terminal block or other power supply configuration.

Information used by the processor(s) 24 may be located within storage 28 or a memory 30. The storage 28 may be a non-volatile storage type such as read-only memory (ROM), flash memory, an optical disk, a hard drive, or other non-volatile computer readable media that stores data files such as media for playing music and videos, software for implementing device functions, or preferences for customizing device functions. For example, the storage 28 may contain data files created by the user that specify how much movement is required to vary the display 16 or how much contact is required to adjust input regions on a touch screen in accordance with some embodiments of the present technique. Furthermore, the storage 28 may exist in a removable format such as a CD-ROM, PC-Card, or network component.

Similarly, the memory 30 may store information used by the computer system for various purposes. For example, the memory 30 may store firmware such as an operating system or may store programs that enable user interface functions or processor functions. The memory 30 also may be used for buffering or caching during operation of the device. The memory may include volatile memory such as random access memory (RAM), and/or non-volatile memory such as read-only memory (ROM).

The device 10 may receive additional information from a network. The network device 32 allows the device 10 to communicate over a network, such as LAN, WAN, or the Internet. The device 32 may be a network controller or network interface card (NIC). The network device 32 may allow the device 10 to receive a software upgrade that enables the device 10 to vary the display or touch screen input region in accordance with certain embodiments.

An expansion card 34 also may provide additional information to the device 10. One or more expansion cards 34 may be coupled to the device 10 through a card slot or I/O port contained in the device. The cards 34 may be used to add functionality to the device, such as additional memory, I/O functionality, or networking capability. For example, a card 34 may be used to upgrade an existing device 10 to allow it perform display or input region adjustments in accordance with certain embodiments.

As noted above, a user may interface with the device 10 through a user interface that can be controlled with a touch screen 36. The touch screen 36 may be positioned in front of or behind the display 16 and may be an integrated or stand alone component. For example, in the embodiment illustrated in FIG. 1, the touch screen 36 may be a transparent medium located in front of the display 16 that allows the user to view images and visual indicators on the display screen 16 below. The touch screen 36 is configured to receive input from a user's or object's touch and to send the information to the processor(s) 24, which interprets the touch event and performs a corresponding action. The touch screen 36 may employ any suitable type of touch screen technology such as resistive, capacitive, infrared, surface acoustic wave, electromagnetic, or near field imaging. In some embodiments, the touch screen 36 may be a multi-point touch screen as described in U.S. Patent Application Publication No. 2006/0097991 to Steve Hotelling et al., filed on May 6, 2004, incorporated herein by reference in its entirety for all purposes.

An input/output (I/O) controller 38 may provide the infrastructure for exchanging data between the processor(s) 24 and input/output devices, such as the touch screen 36 and the display 16. The I/O controller 38 may contain one or more integrated circuits and may be integrated with the processor (s) 24 or exist as a separate component. Additionally, the I/O controller 38 may communicate with the I/O devices through a data line or by wireless connections such as USB, Firewire, or Bluetooth.

In some embodiments, the device 10 may include a motion sensing device 40. The motion sensing device 40 may be any device configured to measure motion or acceleration such as an accelerometer or a gyroscope. In one embodiment, the motion sensing device 40 may be a three axes linear accelerometer that includes a sensing element and an integrated circuit interface for providing the measured acceleration to the processor(s) 24.

Input from the motion sensing device 40 may be used to adjust the display 16 and produce motion compensated screens or modified screens with scaled images. Input information is received by the processor(s) 24, which communicate with the display 16 via the I/O controller 38. In the depicted embodiment, a display circuit 42 facilitates communication between the I/O controller and the display 16. Additionally, the display circuit 42 may include a storage element containing motion limits used to determine whether the display 16 should be adjusted. In some embodiments, the display circuit 42 may be integrated within the display 16, the I/O controller 38, or a processor 24.

As noted above, users may interact with the device 10 using the touch screen 36. In some embodiments, the touch screen 36 may include a touch sensing device 44 configured to detect objects in close proximity to the touch screen 36. Alternatively, or in addition, the sensing device 44 may be configured to detect pressure exerted on the touch screen 36. To detect objects and/or pressure, the sensing device 44 may be divided into several independent and spatially distinct nodes 46 positioned throughout the touch screen 36. The nodes 46 may collectively comprise input regions within the touch screen 36. Each time an object is positioned over an input region, a corresponding signal is produced that may be used to manipulate the user interface. In some embodiments, feedback from the touch sensing device 44 may be used to adjust the input regions to produce motion compensated input regions.

A sensing circuit 48 facilitates communication between the I/O controller and the touch screen 36. The sensing circuit 48 receives the signals and supplies them to the processor(s) 24. In some embodiments, the sensing circuit 48 may process the signals before sending them to the processor(s) 24. The sensing circuit 48 also may contain a storage element for storing a touch screen program capable of controlling different aspects of the touch screen 36. For example, the storage element may contain touch limit values used to determine whether an input region should be varied. The sensing circuit 48 may include one or more microcontrollers for monitoring sensing points. In some embodiments, the sensing circuit 48 may be integrated within the touch screen 36, the I/O controller 38, or the processor(s) 24.

Figure 3:
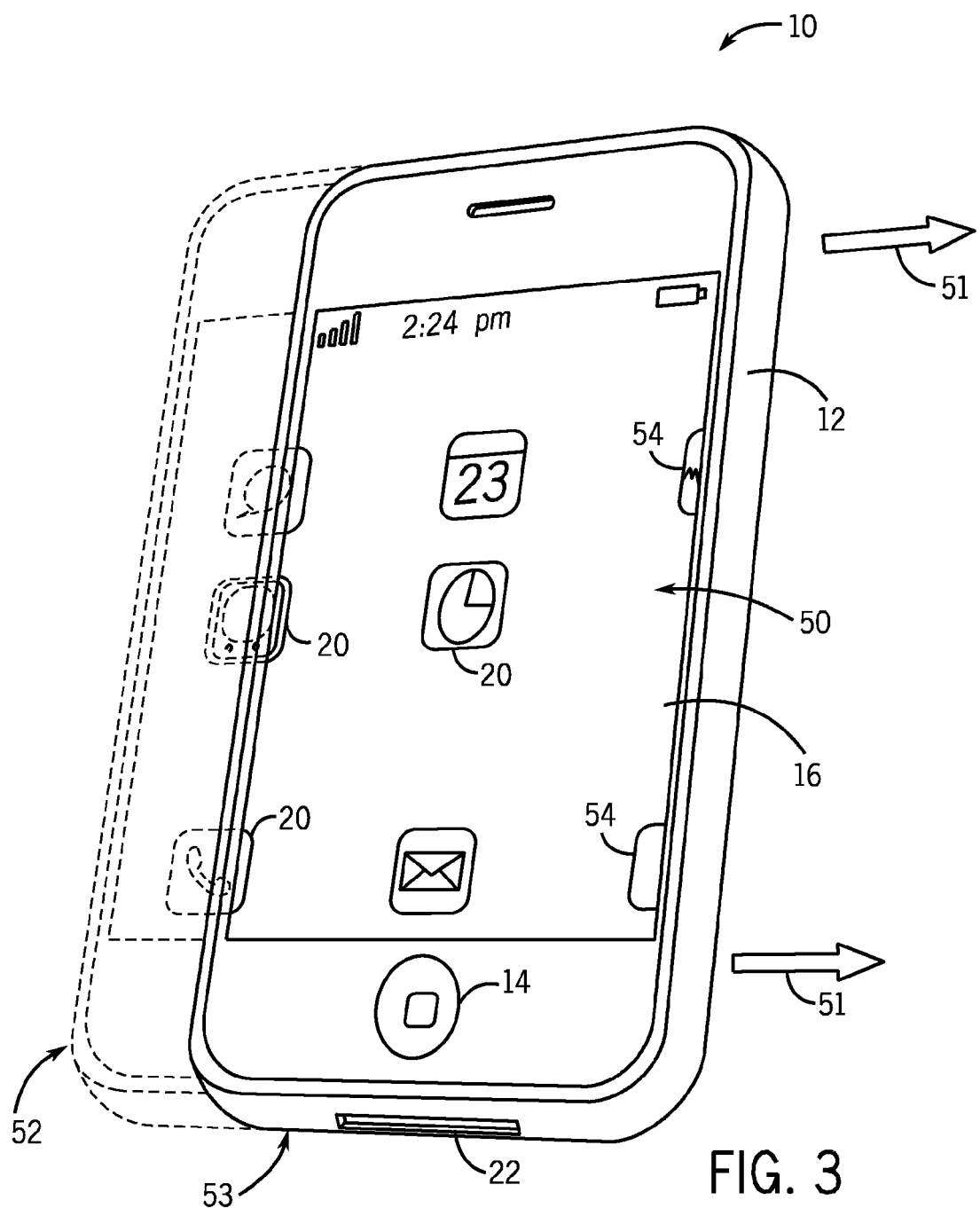
FIG. 3 is a perspective view illustrating the device of FIG. 1 with a motion compensated screen in accordance with one embodiment of the present invention.

FIG. 3 illustrates the device 10 with a motion compensated screen 50 in accordance with one embodiment. The motion compensated screen 50 facilitates viewing of the display 16 while the device is moving. As illustrated, the device 10 has been moved to the right, as generally indicated by arrows 51, from its original position 52 to a new position 53. This change in position may be caused by a user or by environmental instability. For example, a user's hands may shake when holding the device 10, causing the device 10 to shift. In another example, environmental vibrations, such as those experienced in a car, subway, or industrial setting, may cause the device 10 to shift. As will be appreciated, although the device 10 has been moved to the right in FIG. 3, the present technique may be applied to any combination of device movements in a variety of directions.

As shown in FIG. 3, although the device 10 has shifted to a new position 53, the screen 50 has compensated for the motion so the images 20 have stayed in relatively the same position from the perspective of the user. This is best illustrated by comparing FIGS. 1 and 3. In FIG. 1, some images 20, such as the clock and envelope, are located on the right side of the screen 18 while other images 20, such as the telephone and television, are located on the left side of the screen 18. Returning to FIG. 3, it can be seen that when the device 10 was in its original position 52, as indicated generally by the dashed lines, the images 20 were in the same positions illustrated in FIG. 1. That is, the images 20, such as the telephone and television, were on the left side of the screen while other images 20, such as the calendar and envelope, were on the right side of the screen. However, when the device moved to its new position 53, as indicated by the arrows 51, the images 20 did not move along with the device. Thus, the motion compensated screen 50 shows the images 20 in new positions relative to the device. For example, images 20, such as the telephone and television, are positioned partially off the left side of the screen, while other images 20, such as the envelope and clock, are positioned near the center of the screen. In other words, the position of these images 20 has stayed the same, while the device 10 has moved around them. Additionally, new images 54 have begun to appear on the edge of the screen 50. In some embodiments, these new images 54 may be originally present on the screen 50 but not shown on the display 16 because they are located outside the display borders.

Figure 4:
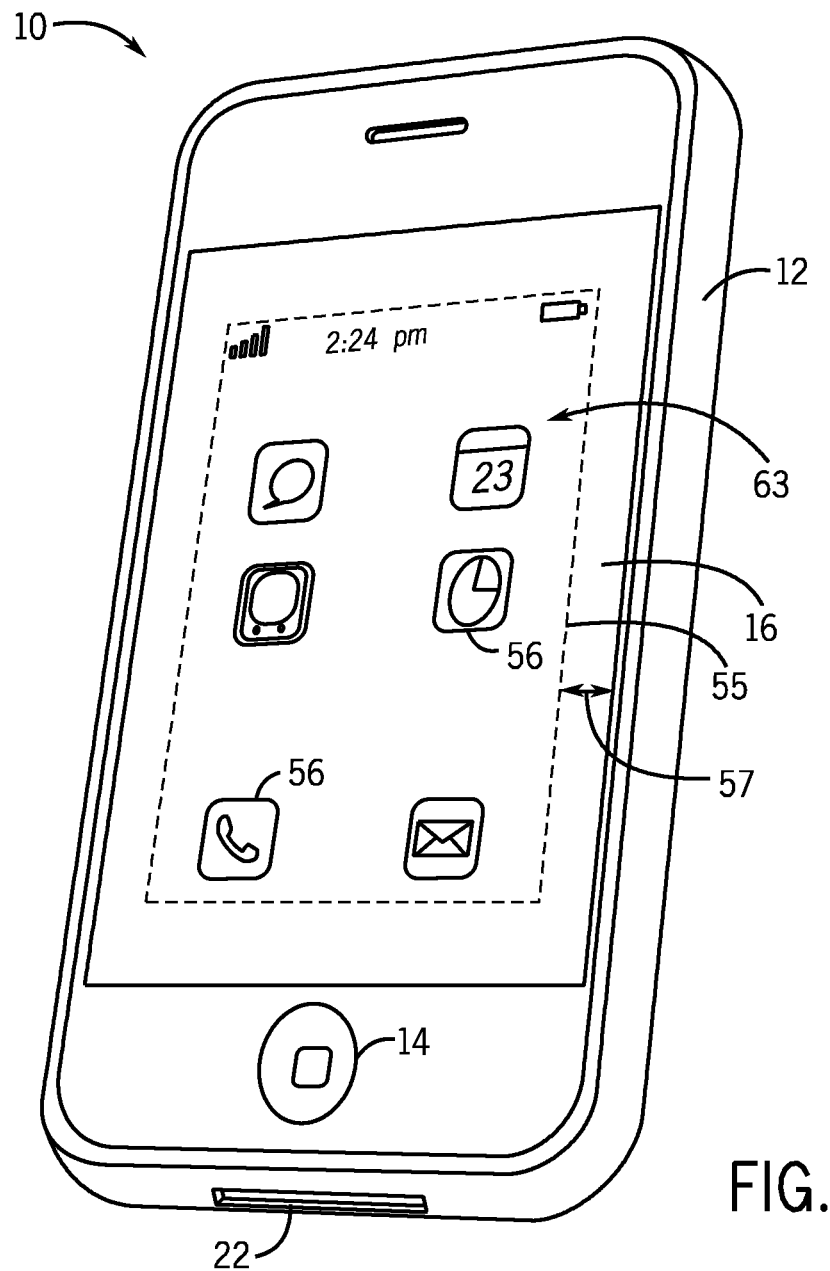
FIG. 4 is a perspective view illustrating the device of FIG. 1 with a reduced display area to allow for motion compensation of screens in accordance with one embodiment of the present invention.

FIG. 4 illustrates another embodiment of the device 10, which may produce motion compensated screens. In this embodiment, the screen 18 (shown in FIG. 1) has been reduced in size to produce a reduced screen 63 that fits within a display area 55, indicated generally by the dashed lines. As shown, the display area 55 is located a distance 57 from the edge of the display 16 so the reduced screen 63 fits within the display 16. The screen 18 includes scaled images 56, depicted here as scaled down versions of the images 20 shown in FIG. 1. The reduced size of the screen 63 and images 56 allows room for motion compensation to occur as shown in FIG. 5.

Figure 5:
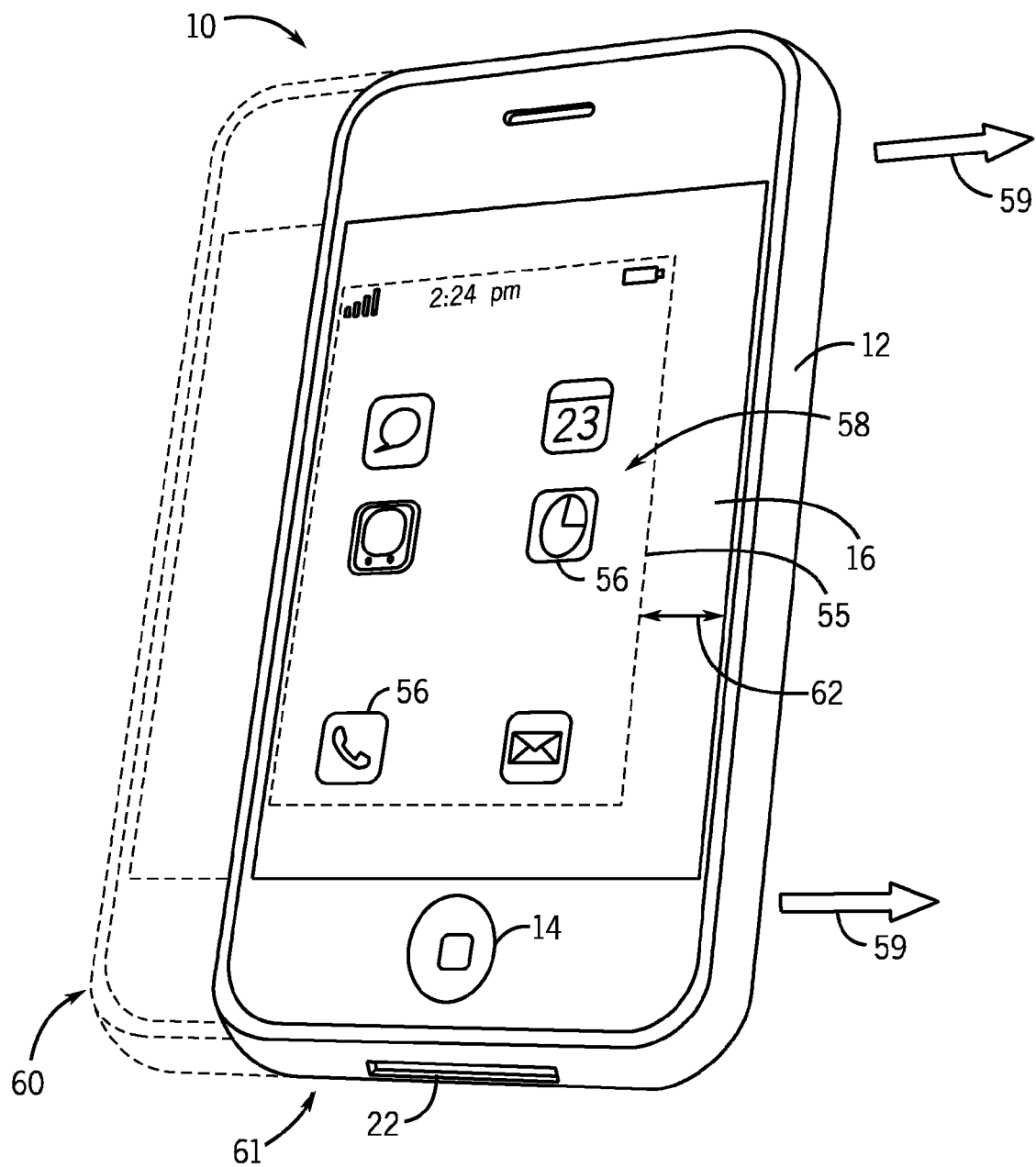
FIG. 5 is a perspective view illustrating the device of FIG. 4 with a motion compensated screen in accordance with one embodiment of the present invention.

FIG. 5 illustrates a motion compensated screen 58 produced after the device 10 has been moved to the right, as generally indicated by arrows 59, from its original position 60 to a new position 61. Similar to the embodiment shown in FIG. 3, although the device 10 has shifted from its original position 60 to a new position 61, the motion compensated screen 58 has compensated for the motion so the images 56 have stayed in relatively the same position from the perspective of the user. This is best illustrated by comparing FIGS. 4 and 5. In FIG. 4, some images 56, such as the clock and envelope, are located on the right side of the display 16 while other images 56, such as the telephone and television, are located on the left side of the display 16. Returning to FIG. 5, it can be seen that when the device 10 moved, the images 20 did not move along with the device. Consequently, images 56, such as the clock and envelope, are now located near the center of the display 16 while other images 56, such as the telephone and television, are located farther to the left side of the display 16. Thus, the motion compensated screen 58 shows the images 58 in new positions relative to the device.

In this embodiment, the entire display area 55 has moved with respect to the device 10, so the display area has stayed in the same position relative to the user. The display area 55 is now located a distance 62 from the right edge of the display 16. This distance may vary depending on the amount and direction of the motion.

Figure 6:
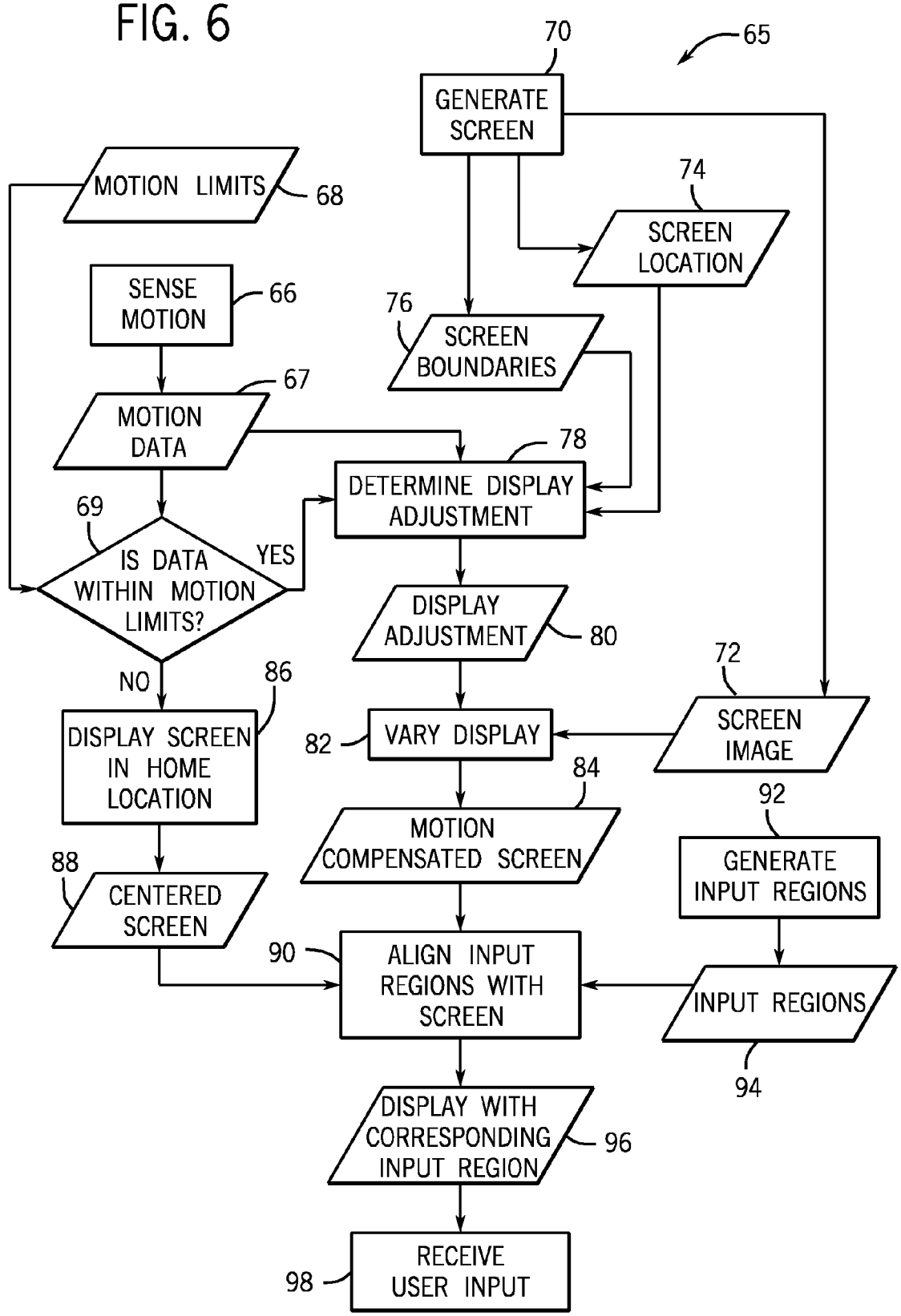
FIG. 6 is a flow chart depicting a method for producing a motion compensated screen in accordance with one embodiment of the present invention.

Referring now to FIG. 6, a flowchart is depicted of an exemplary method 65 for producing a motion compensated screen 50. This method 65 may be employed for all types of motion compensated screens, such as a screen with images located beyond the display as illustrated in FIG. 3, and a reduced size screen as illustrated in FIGS. 4 and 5.

The method 65 may begin by sensing (block 66) motion of a device to produce motion data 67. In one embodiment, an accelerometer may sense motion along one, two, or three axis. The device may then compare (block 69) the motion data 67 to preset motion limits 68 to determine if the motion data 67 is within the motion limits 68. The motion limits 68 define a range of motion where compensation of screens may occur. In other words, if the motion data 67 falls within the motion limits 68, the screen may be motion compensated. On the other hand, if the motion data 67 falls outside the motion limits 68, for example motion that is too slow or too fast, no compensation may occur.

In some embodiments, the motion limits 68 may be contained within the display circuit 42, expansion card 34, memory 30, or storage 28 of the device 10, as shown in FIG. 2. The motion limits 68 also may be configurable by a user and stored in storage 28 of the device 10. For example, the motion limits 68 may be set to require a maximum or minimum amount of motion before motion compensated screens are produced. The motion limits 68 may include variables such as distance, acceleration, percent change over time, and other movement properties. The comparison step illustrated in block 69 may be performed by either the display circuit 42 or the processor(s) 24.

Contemporaneously to sensing motion, the method 65 may include generating a screen (block 70) to produce screen properties including a screen image 72, a screen location 74, and screen boundaries 76. In one embodiment, such as that shown in FIG. 3, the screen image 72 may be a collection of images 20 configured to be displayed on an area larger than the display 16 of the device 10. In another embodiment, such as that shown in FIGS. 4 and 5, the screen image 72 be a collection of reduced images 56 configured to be displayed within a display area 55 of the display 16. Returning to FIG. 6, the screen location 74 determines where the screen image 72 is located on the display 16, and the screen boundaries 76 specify the outer limits of the screen image 72. For example, in the embodiment illustrated in FIG. 3, the outer limits of the screen image 72 may not be visible on the display 16. In another example, such as the embodiment illustrated in FIGS. 4 and 5, the outer limits of the screen image 72 may extend beyond the borders of the display area 55 but remain visible on the display 16.

Returning to the comparison block 69, if the data is within the motion limits 68, which define a range where motion compensation may occur, the method 65 may include determining (block 78) a display adjustment 80. The display adjustment 80 is determined by analyzing the motion data 67, screen location 74, and screen boundaries 76. The motion data 67 determines the direction of the adjustment, while the motion data 67 combined with the screen location 74 and screen boundaries 76 determines the amount of the adjustment. For example, if the motion data 67 represents motion to the right, the screen location 74 may adjust an equal distance to the left so that the screen image 72 stays in a fixed location relative to the user while the device 10 moves. This type of adjustment is illustrated in FIGS. 3-5, where the motion compensated screens 50 and 58 display images 20 and 56 that have stayed in essentially the same position relative to the user while the device 10 has shifted from an original location 52 and 60 to a new location 53 and 61.

Returning to FIG. 6, if the screen image 72 is already in a location close to the right boundary, the screen location 74 may adjust in a less than equal distance to the left so that the screen boundary 76 is not exceeded on the display. Once the display adjustment 80 is determined, the display on the device is varied (block 82) to present the screen image 72 in the adjusted location producing a motion compensated screen 84. In another example, the motion data 67 may represent a motion amount equal to zero motion. This may occur if the device 10 is steady. In this example, the display adjustment amount (block 78) may be zero.

In some embodiments, the motion data 67 may include motion speed in addition to motion direction. The motion speed data may determine the rate at which the display adjusts (block 78). For example, if the motion data 67 represents rapid motion to the right, the screen may adjust an equal distance to the left within a proportional time. However, if the screen image 72 is already in a location near the right boundary, the screen location 74 may adjust to the left at a slower rate so that the screen boundary 76 is not exceeded on the display. In such an embodiment, the motion compensation may not exactly or entirely negate the motion, but may instead reduce the magnitude of or effects of the motion to facilitate viewing of the display.

Returning to the decision block 69, if the motion data 67 is outside the range of motion limits 68, no motion compensation may occur. Thus, the screen is displayed in the home location (block 86) to produce a centered screen 88. For example, in one embodiment the home location may exist where the screen image 72 is centered on the display 16. This example is illustrated in FIGS. 1 and 4 where the images 20, 56 are centered on the display 16.

Referring again to FIG. 6, the motion data 67 may be outside the motion limits 68 if the device 10 is moved too far in one direction. For example, if the device 10 is moved a distance exceeding the screen boundary 76 in one direction, the screen image 72 may be displayed so that it is centered on the display 16. This step may allow a user to rapidly turn, rotate, or extend the device 10 to show an image, such as a photograph, to another user without losing the current location of the screen image.

Regardless of whether the screen is a motion compensated screen 84 or a centered screen 88, the method may include aligning input regions 94 with the display screen (block 90) if the device includes a touch screen 36. As noted above, the touch screen 36 may be positioned in front of or behind a display screen 18 and contain nodes 46 forming input regions 94. Contemporaneously to sensing motion, the method may include generating input regions (block 92) that correspond to images such as graphical icons on the display. The generated input regions 94 may consist of a group of nodes 46 on the touch screen 36, and the location of the input regions 94 may be stored in the processor(s) 24, sensing circuit 48, or storage 28 of the device, as shown in FIG. 1. When the nodes 46 within an input region 94 are touched, the processor(s) 24 may receive a signal and execute a corresponding command.

These input regions 94 may be aligned (block 90) with the graphical images 20 and 56, i.e. icons, on the display screen 18 so when the user touches nodes 46 of an input region 94, the processor performs a command corresponding to the graphical icon. For example, the screen 18 may display a graphical image of a calendar. The nodes aligned with the calendar icon may be defined as an input region 94 corresponding to a command that opens a calendar program. Consequently, when the user touches the calendar icon, the device opens a calendar program. As will be appreciated, many other command and graphical object combinations may be employed including scrolling a screen, dragging a photo, or dialing a phone number.

Returning to the alignment block 90, once the display 96 includes corresponding input regions, the device is ready to receive user input (block 98). In one embodiment, the input regions on the touch screen 36 are located directly above graphical images 20 on the underlying display screen 18. Therefore, when the user touches the graphical images 20, the device performs a corresponding command. As will be appreciated, the touch screen may be a multi-point touch screen configured to receive multiple touches, which in combination correspond to commands.

Of course, as noted above, some devices may not contain a touch screen. For example, in one embodiment, the device 10 may be a portable media player configured to play video, such as movies, video clips, or television shows. In cases where no touch screen is included, there may be no need to align input regions 94. Consequently, the method 65 may terminate once a motion compensated screen 84 or a centered screen 88 is produced.

Figure 7:
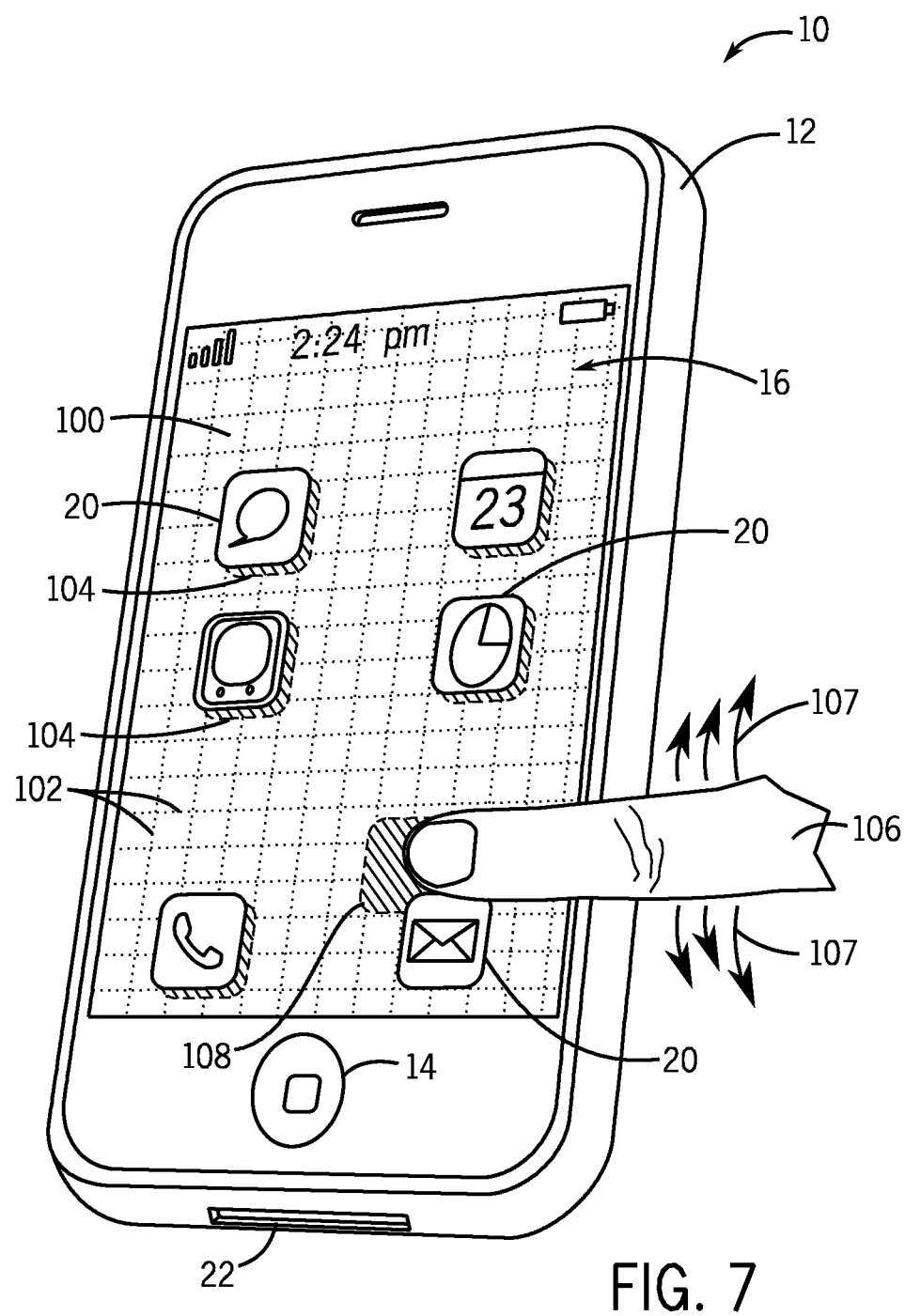
FIG. 7 is a perspective view illustrating the device of FIG. 1 with a motion compensated input region in accordance with one embodiment of the present invention.
Figure 8:
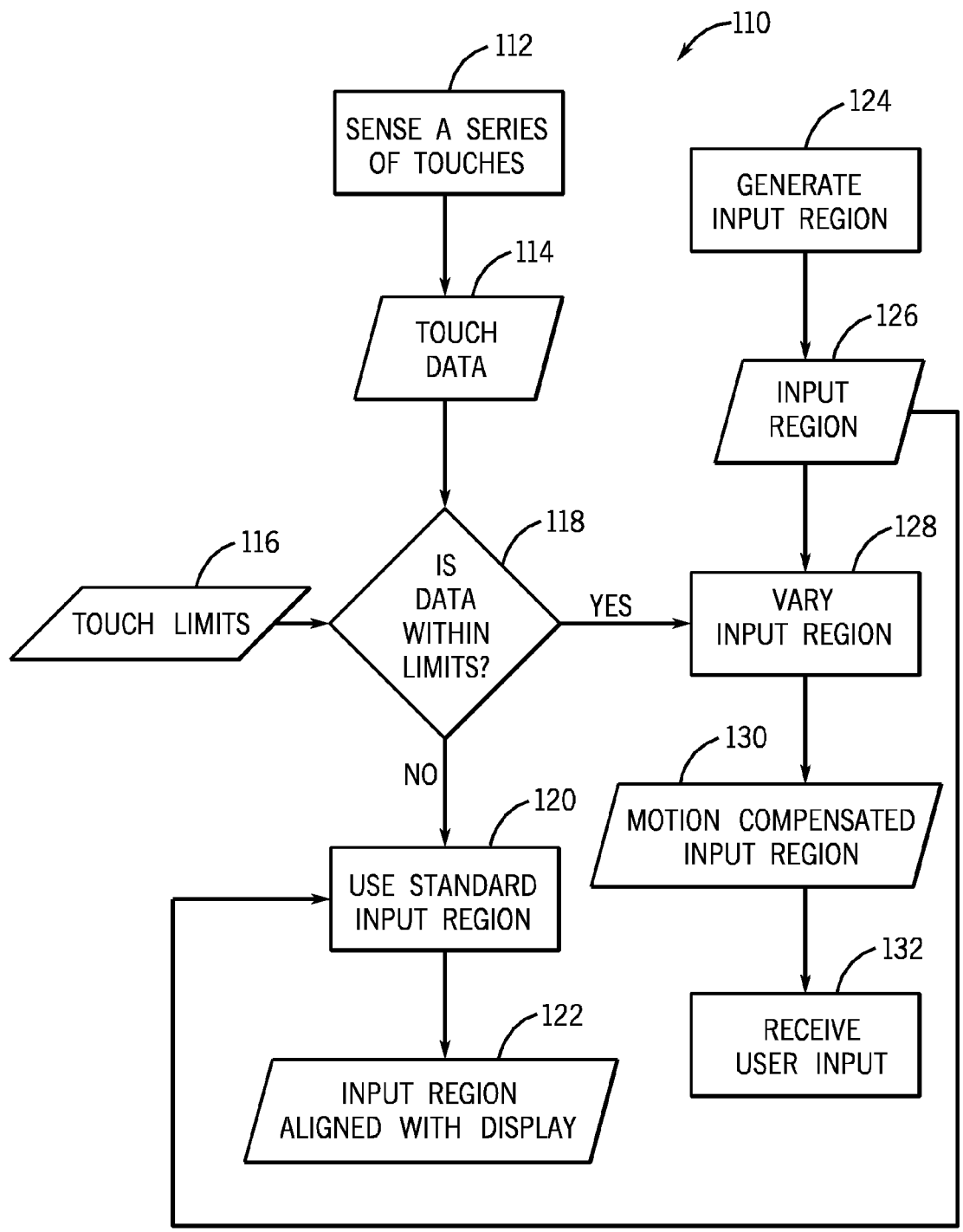
FIG. 8 is a flow chart depicting a method for producing a motion compensated input region in accordance with one embodiment of the present invention.

While FIGS. 3-6 illustrate compensation for motion of a device, FIGS. 7 and 8 depict compensation for motion of a selection object 106. Accordingly, FIG. 7 illustrates the device 10 with a motion compensated touch screen 100 in accordance with one embodiment. The motion compensated touch screen 100 facilitates selection of a user interface element, such as an icon, while the selection object 106 is moving. As discussed above in reference to FIG. 2, the touch screen 100 may be positioned in front of or behind the display 16. In FIG. 7, the touch screen 100 is illustrated behind the display 16 for ease of illustration. The touch screen 100 includes a plurality of nodes 102 positioned throughout the touch screen that may be used to define input regions 104. A signal is produced each time an object 106 is positioned over an input region. The object 106 may be any item configured to interact with the touch screen 100, such as a finger, stylus, or pointer. The signal is then sent to the processor(s) 24 to perform an action. For example, in the embodiment illustrated in FIG. 7, an input region 104 is located behind an image showing a conversation balloon. The input region 104 may correspond to an action that opens a messaging application when an object 106 is positioned over the input region 104.

The input regions 104 are typically aligned with the images 20 located on the display 16. However, the location of the input regions 104 may be varied in response to motion of the selection object 106. For example, the object 106, which is a finger in the illustrated embodiment, is moving in an up and down motion, as indicated generally by arrows 107. This may be caused by unsteadiness of a user's hands. The device 10 senses this motion and may adjust for it by producing a motion compensated input region 108. As shown, the motion compensated input region 108 is no longer aligned behind the image 20 of the envelope. Instead, the compensated input region 108 has been shifted upwards and to the left to account for the motion of the object 106. In the illustrated embodiment, the motion compensated input region 108 corresponds an image 20 depicting an envelope, which may correspond to a mail application. Consequently, when the input region 108 is selected, the device may open a mail application. The adjustment of the input region facilitates selection of the image 20 despite vibration or interfering motion in the selection object 106, depicted here as a finger, thereby facilitating use of the user interface of the device 10. In other words, the motion compensated input regions 108 make it easier for a user to select items on a display screen.

Figure 9:
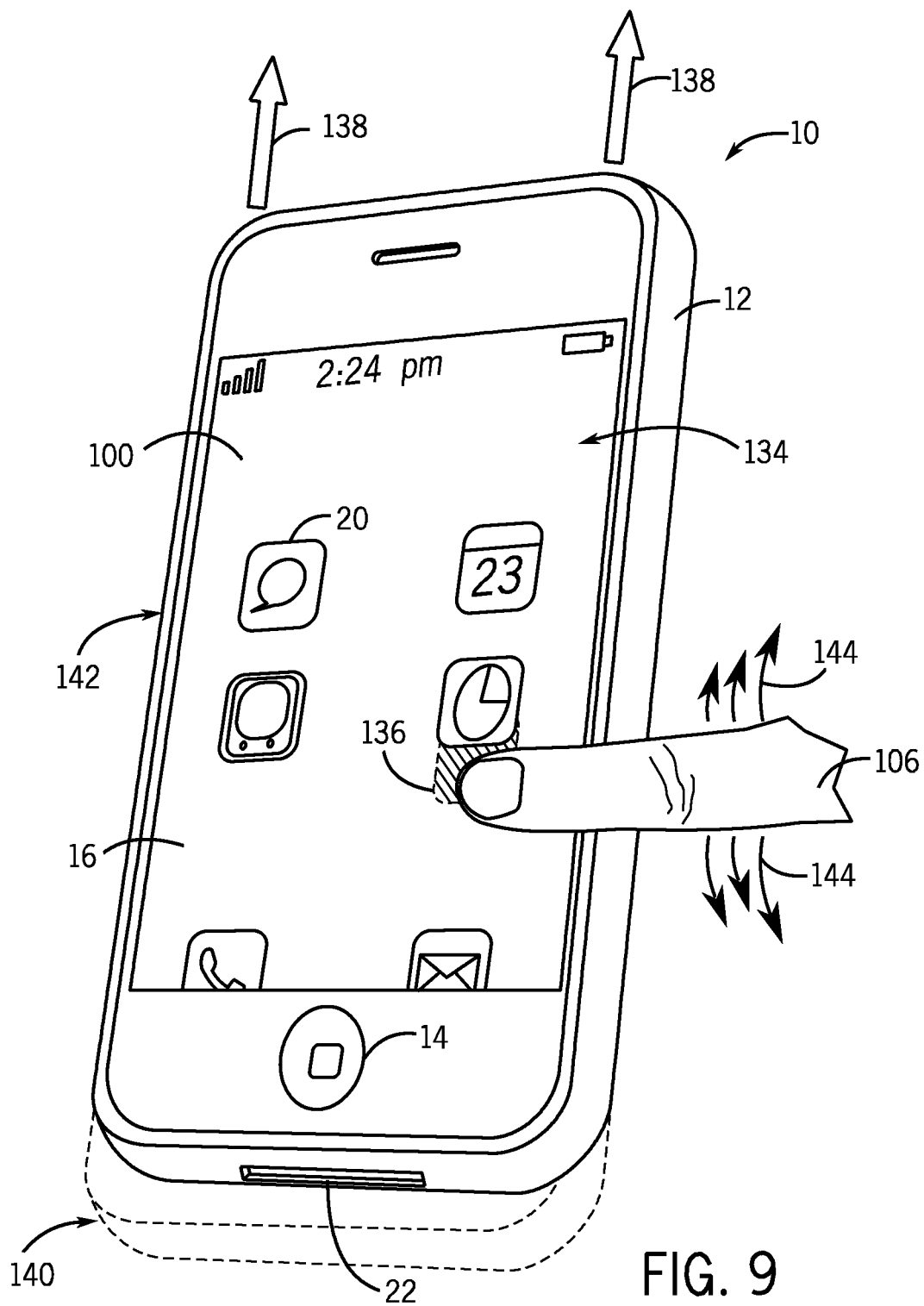
FIG. 9 is a perspective view illustrating the device of FIG. 1 with both a motion compensated screen and a motion compensated input region in accordance with one embodiment of the present invention.

FIG. 8 is a flowchart depicting an exemplary method 110 for producing a motion compensated input region 108 as illustrated in FIG. 9. The method may begin by sensing a series of touches (block 112) to generate touch data 114. The series of touches may be a rapid succession of touches, such as may occur when an object 106 approaches the touch screen 36. In addition to being generated when the object 106 contacts the touch screen 36 (a physical touch), the touch data 114 may be generated as an object 106 approaches the touch screen 36 (an approach touch). In other words, the touch data 114 includes data from both object contact with and object proximity to the touch screen 36.

In one embodiment, the touch sensing device 44 may include nodes 46 electrically coupled to a sensing circuit 48, as shown in FIG. 2. When an object 106 is positioned over a node 46, a capacitance forms between the object 106 and the node 46. The sensing circuit 48 detects capacitance changes generated by objects 106 to produce touch data 114 such as location, pressure, direction, speed, and acceleration of objects proximate to the touch screen 36. In other embodiments, the touch sensing device 44 may utilize infrared, surface acoustic wave, electromagnetic, or other comparable technology.

Referring again to FIG. 8, once the touch data 114 is generated, it may be compared to touch limits 116 to determine if the data is within these limits (block 118). The touch limits 116 define a range of touch data 114, which includes contact and proximity data, where compensation of input regions 104 may occur. In other words, if the touch data 114 falls within the touch limits 116, the input regions 126 may be motion compensated. On the other hand, if the touch data 114 falls outside the touch limits 116 no compensation may occur.

In one embodiment, the touch limits 116 include location and pressure ranges stored within the device in components such as the sensing circuit 48, expansion card 34, storage 28, or memory 30 of the device. The location range, for example, may require the locations of the touches to be within a certain radius of each other. If the locations are more than a specified distance apart, the touch data 114 will fall outside of the limits. In another example, the pressure range may require the object 106 to contact the touch screen 36 with a specified force. For example, if the object 106 contacts the nodes 46 with a force above a certain value, the touch data 114 may fall outside of the touch limits 116. If the data falls outside of the limits 116, a standard input region, i.e. an uncompensated input region, may be used (block 120). The standard input region (block 120) may be stored within the device and be configured to align with a graphical image on the display, thus, producing an input region aligned with the display 122. The input region may then be used to receive user input for the device (block 132).

Returning to the decision block 118, if the touch data 114 falls within the touch limits 116, the device may vary (block 128) the input region 126 instead of using (block 120) the standard input region. Contemporaneously to sensing a series of touches (block 112), the device may generate (block 124) an input region 126. As shown in FIG. 7, the input region as generated may be configured to align with a graphical image 20 on the display 16. In one embodiment, the input region is defined by nodes 46 on a touch screen 36 located above the display 16. In a standard configuration, the nodes 46 of the input region may closely mirror the dimensions and location of the graphical image 20 on the display 16.

Returning to FIG. 8, if the touch data 114 falls within specified touch limits 116, the input region may be varied (block 128) to produce a motion compensated input region 130. For example, if the touch data 114 includes locations within close proximity of each other but falling to the right of a standard input region (block 120), the input region 126 may be extended or moved to the right to encompass these locations. Additionally, the apparent intentionality of the touches may be taken into account. For example, the touch limits 116 may require that the touch be greater than a specified force so that unintentional touches near an input region do not create variation of the input region. In another example, the touch limits 116 may require that the touch be less than a specified force so that intentional touches directed other images near an input region do not create variation of the input region. Once the input region 126 has been varied (block 128), the motion compensated input region 130 is produced, and the device is ready to receive user input (block 132).

FIG. 7 depicts an embodiment of a motion compensated input region 136 where the graphical image 20 on the display 16 remains in a constant location so that the input region 108 no longer aligns directly with the graphical image 20. This may assist the user in viewing a stable graphical image 20 to use as a point of reference for contacting the touch screen 36. In other embodiments, however, the image 20 may be shifted to align with the motion compensated input region 108.

Of course, a touch screen may contain numerous input regions 104. As will be appreciated, more than one input region 104 may be varied simultaneously and independently. Furthermore, a single input region may be varied multiple times to facilitate user selection of an image on the touch screen.

The method for varying a display 65 illustrated by FIGS. 3-6 may be used in conjunction with the method for varying an input location 110 illustrated by FIGS. 7 and 8 to produce a motion compensated display screen and a motion compensated touch screen. Referring now to FIG. 9, the exemplary device 10 is illustrated with both a motion compensated screen 134 and a motion compensated input region 136. In the depicted embodiment, the device 10 has undergone an upward motion as indicated generally by arrows 144, causing the device to shift from its original position 140 to a new position 142. Because of the motion compensated screen 134, the images 20 have remained in approximately the same position, even though the device has shifted around them. As noted above, this makes it easier for a user to view the display 16 while the device 10 is moving.

The device 10 also has a motion compensated input region 136. As discussed above, input regions 104 are typically aligned behind the images 20. However, the object 106, which is illustrated as a user's finger, is moving in an up and down motion an indicated by arrows 144. To compensate for this motion, the device 10 has shifted the input region in a downward direction to produce a motion compensated input region 136. As noted above, the motion compensated input region 136 makes is easier for a user to select an image on the touch screen 100.

The device 10 may vary the display 16 and the input region 104 simultaneously or at different times as needed. For example, when the motion sensing device 40 contained within the device 10 senses that the device 10 has moved, it may vary the display (block 82) as illustrated in FIG. 6. Similarly, when the touch sensing device 44 contained within the device 10 senses a series of touches within the touch limits 116, it may vary the input region (block 128), as illustrated in FIG. 8. If the motion sensing device 40 and touch sensing device 44 receive data at the same time, the device 10 may simultaneously produce a motion compensated screen 50 and 58 and a motion compensated input region 108. The device may execute these adjustments in rapid succession or simultaneously as it is sensing motion. Furthermore, the motion adjustments may be made contemporaneously to when the device senses motion.

As will be appreciated, the device 10 may be configured to respond independently to the motion sensing device 40 and the touch sensing device 44. In some embodiments, the device 10 may be configured only to perform one type of motion compensation. For example, a portable DVD player without a touch screen may be configured to only produce motion compensated screens 50 and 58. On the other hand, a device containing a touch screen 36 may only be configured to produce motion compensated input regions 108. Additionally, the device 10 may be configured to allow a user to disable the motion compensation features.

FIGS. 10-16 illustrate other embodiments and a method that may be used to compensate for both motion of the device and motion of the selection object. While FIGS. 3-9 involve shifting the display and/or input regions to compensate for motion, FIGS. 10-16 involve scaling the images and/or input regions to compensate for motion.

Figure 10:
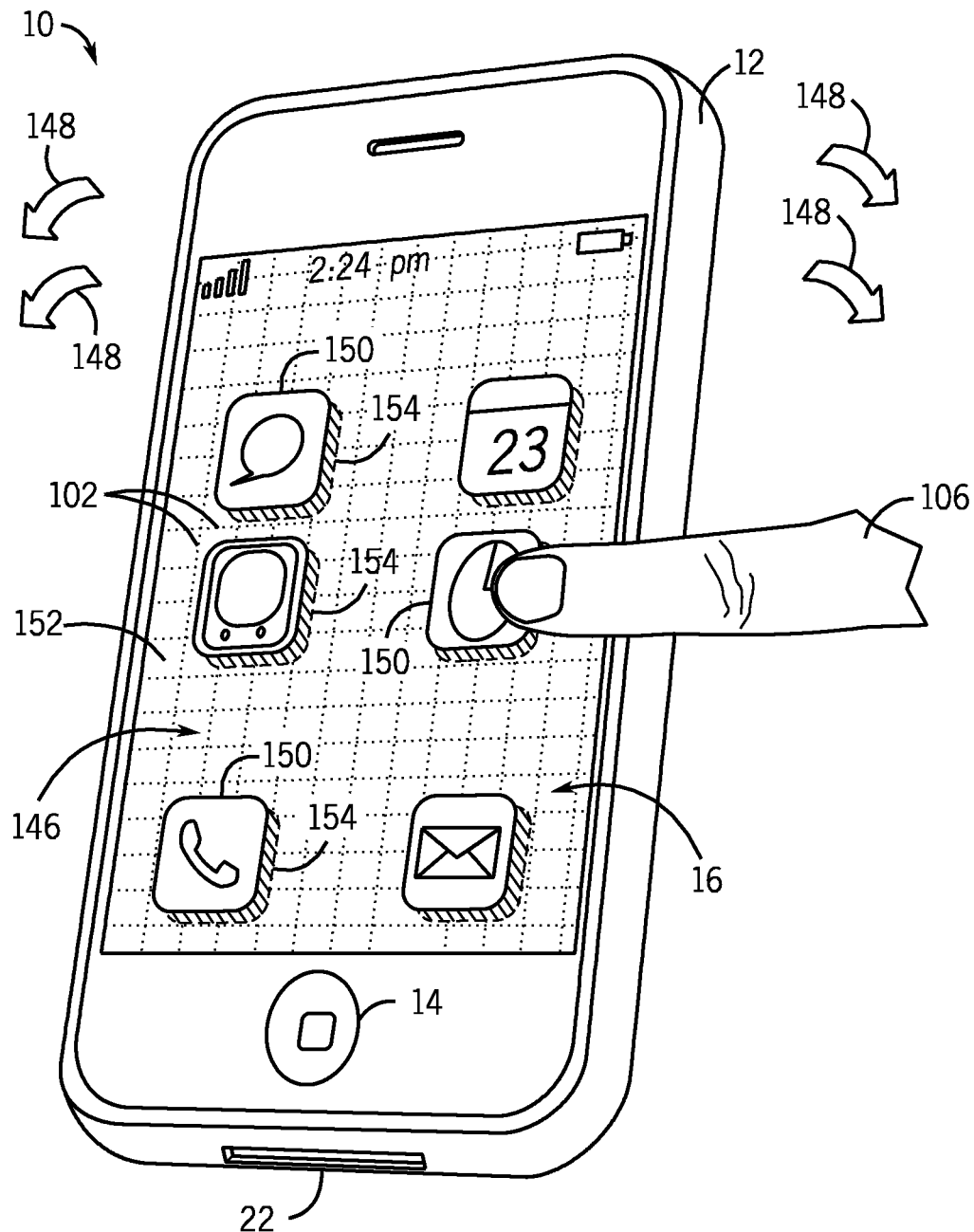
FIG. 10 is a perspective view illustrating the device of FIG. 1 with scaled input regions in accordance with one embodiment of the present invention.

FIG. 10 illustrates the device 10 with a modified screen 146 in accordance with one embodiment. The modified screen 146 facilitates the viewing of images on the display 16 while the device 10 is moving and also facilitates the selection of input regions while the selection object is moving. As illustrated, the device 10 is moving in a side-to-side motion as indicated generally by arrows 148. This motion may be caused by a user or by environmental instability. In response to the motion, the modified screen 146 contains scaled images 150. These scaled images 150 are larger versions of the original images 20 shown in FIG. 1. The increased size of the scaled images 150 facilitates viewing of the images 150 when the device is moving. In other embodiments, the scaled images 150 may be smaller versions of the original images. For example, if less motion is sensed, the scaled images 150 may be reduced in size to allow more images to be included on the modified screen 146.

The device 10 also includes a touch screen 152, which may be positioned in front of or behind the display 16. In FIG. 10, the touch screen is illustrated behind the display 16 for ease of illustration. Input regions comprised of nodes 102 have been modified in response to the motion to produce scaled input regions 154. The scaled input regions 154 align with the scaled images 150 to form a user interface containing selectable images. For example, when the object 106, shown here as a finger, approaches or contacts a scaled image 150 and corresponding scaled input region 154, the device 10 may perform a function corresponding to the scaled image 150. As shown in FIG. 10, the object 106 is selecting a clock icon, which may cause the device to open a clock program displaying the time in various parts of the world.

As shown in FIG. 10, the scaled input regions 154 have been increased in size to correspond to the larger scaled images 150. The increased size of the scaled input regions 154 facilitates selection of the input regions when the device is moving. The increased size may also facilitate selection of the input regions when the object 106 is moving due to environmental instability that causes both the device 10 and the object 106 to move. In other embodiments where the scaled images 150 are reduced in size, the scaled input regions 154 also may be reduced in size to align with the scaled images 150.

Figure 11:
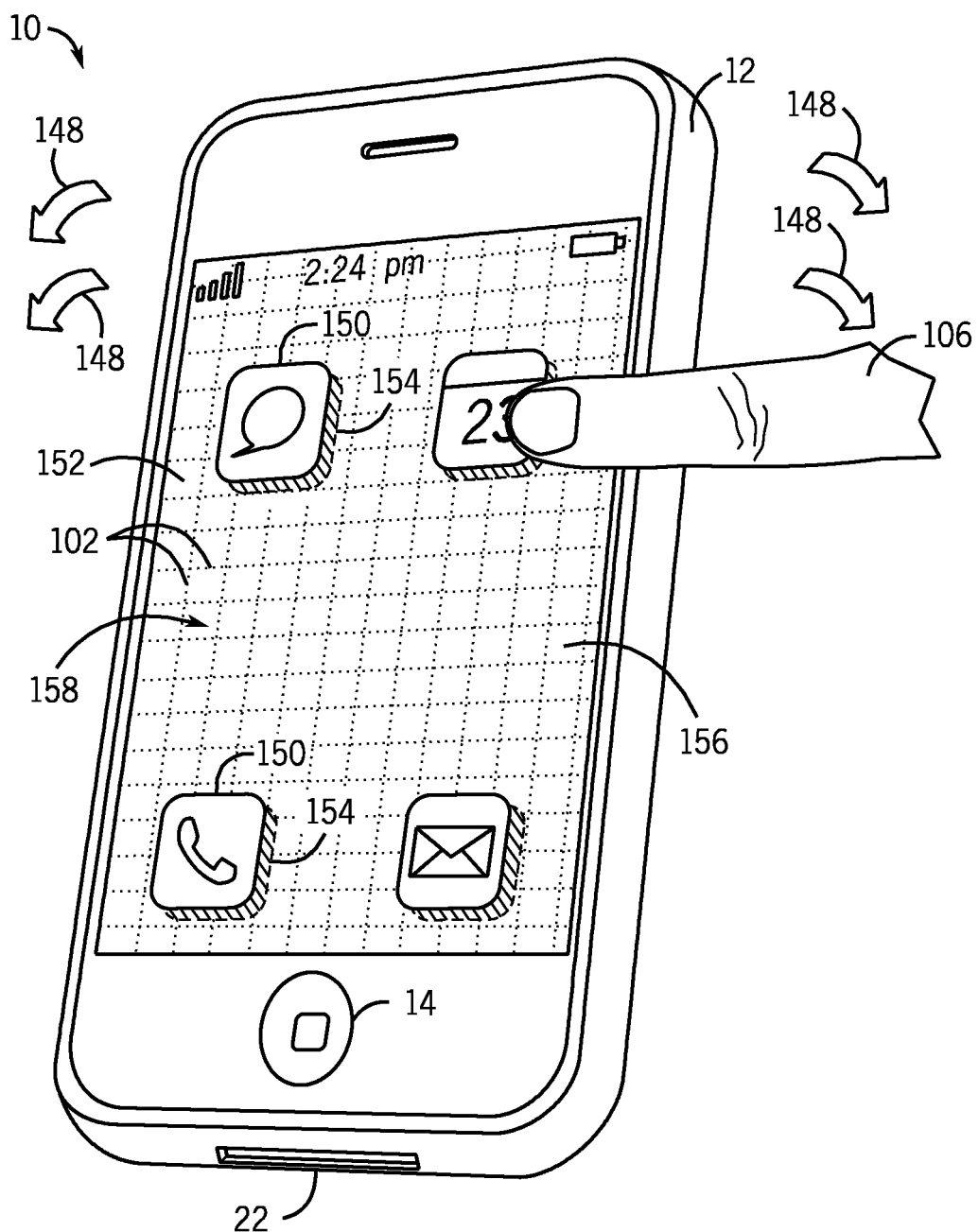
FIG. 11 is a perspective view illustrating the device of FIG. 1 with scaled input regions and an apportioned display in accordance with one embodiment of the present invention.

FIG. 11 illustrates another embodiment of the device 10 with scaled images 150 and an apportioned display 158. Similar to FIG. 10, a modified screen 158 contains the scaled images 150 with corresponding scaled input regions 154. However, in this embodiment, only a portion of the modified screen 158 is displayed as an apportioned display 158. As illustrated, the middle row of scaled images 150 and corresponding input regions 154 have been omitted to produce the apportioned display 158. The modified screen 158 may be apportioned based on properties such as the number or scaled images 150, the amount of motion sensed, the proximity of the scaled images 150 to each other, the relative sizes of the scaled images 150, the speed of the motion, and the like. For example, in FIG. 10, the middle row of scaled images 150 is in close proximity to the top row of scaled images 154. The apportioned display 156 shown in FIG. 11 has omitted this middle row of scaled images 150 to provide more space between the selectable scaled images 150 and facilitate their selection. In other embodiments, the number and location of the scaled images 150 omitted from the apportioned display 156 may vary based on the apportionment properties discussed above.

The scaled images 150 omitted from the apportioned display 156 may be displayed on subsequent screens. A user may navigate through screens containing the omitted scaled images using an input structure 14 (FIG. 1) or by using the touch screen 152. For example, to view a screen containing the omitted scaled images, an object 106, such as a finger, may be used to drag the screen 158 to the left to display a new screen. The apportioned display 156 may contain two or more screens 158 containing different scaled images 150 that a user may scroll through. In some embodiments, the user may be able to set the number of screens for an apportioned display using device properties stored within the memory 30 (FIG. 2) of the device 10.

Figure 12:
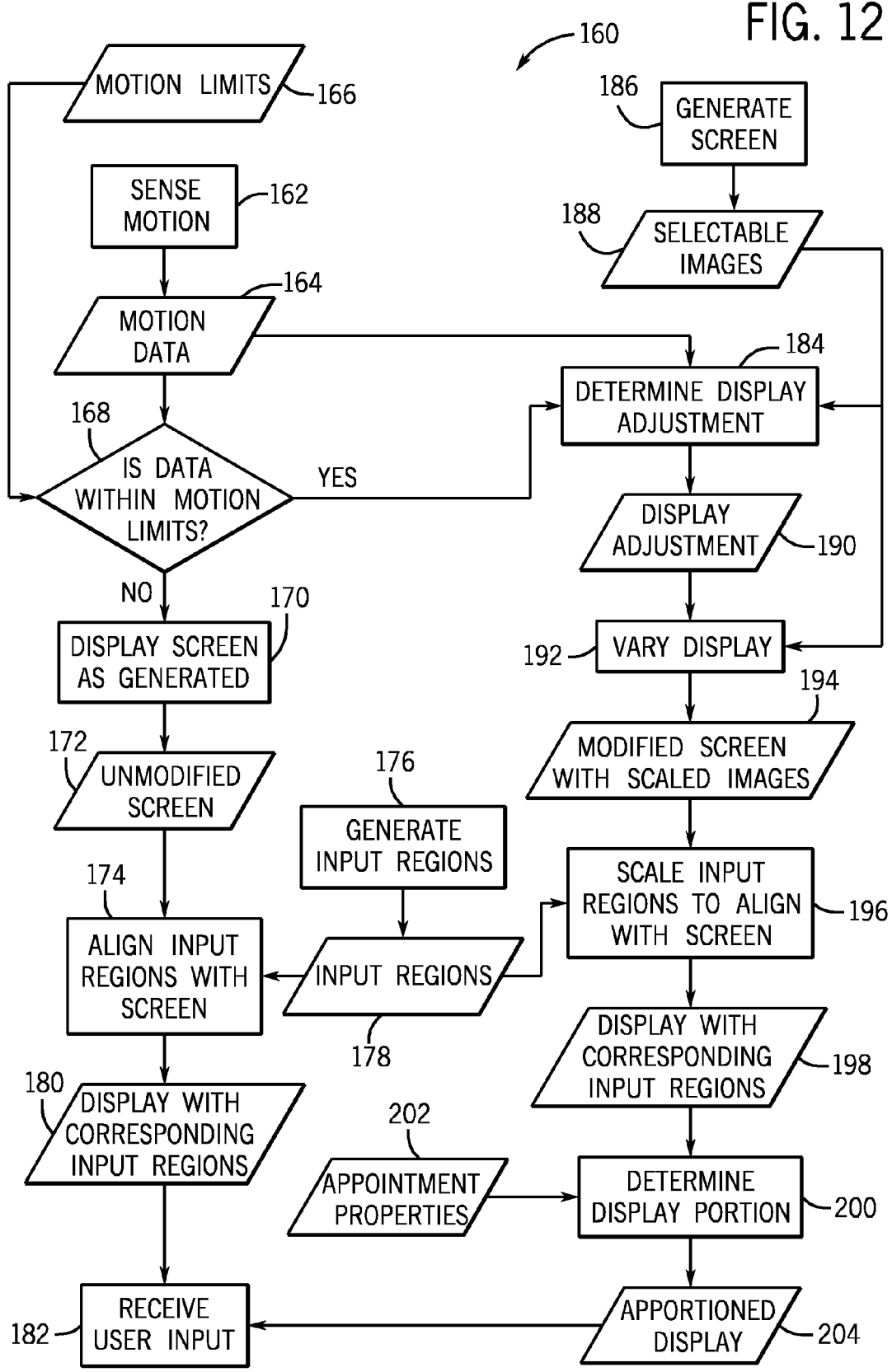
FIG. 12 is a flow chart depicting a method for producing a scaled input region and apportioned display in accordance with one embodiment of the present invention.

FIG. 12 is a flowchart depicting an exemplary method 160 for producing a modified screen 146 as illustrated in FIG. 10 and an apportioned display 156 as illustrated in FIG. 11. The method may begin by sensing motion of the device (block 162) to produce motion data 164. In one embodiment, an accelerometer may sense motion along one, two, or three axis. The system may then compare the motion data 164 to preset motion limits 166 to determine if the motion data 164 is within the motion limits (block 168). The motion limits 166 define a range of motion where a display adjustment may occur to produce a modified screen 146 (FIG. 10) and an apportioned display 156 (FIG. 11). In other words, if the motion data 164 falls within the motion limits 166, the display may be adjusted. On the other hand, if the motion data 164 falls outside the motion limits 166, for example motion that is too slow or too fast, no display adjustment may occur. In some embodiments where the device 10 also may produce a motion compensated screen according to method 65 (FIG. 6), the motion limits 166 may correspond to the motion limits 68. In other embodiments, the motion limits 166 may be independent values preset by the manufacturer or adjustable by a user.

Similar to the motion limits 68 used to produce a motion compensated screen, the motion limits 166 for adjusting the display may be contained within the display circuit 42, expansion card 34, memory 30, or storage 28 of the device 10, as shown in FIG. 2. The motion limits 166 also may be configurable by a user and stored in storage 28 of the device 10. For example, the motion limits 166 may be set to require a maximum or minimum amount of motion before scaled images are produced. The motion limits 166 may include variables such as distance, acceleration, percent change over time, and other movement properties. The comparison step illustrated in block 168 may be performed by either the display circuit 42 or the processor(s) 24.

Contemporaneously to sensing motion, the method 160 may include generating a screen (block 186) to produce selectable images 188. The selectable images 188 may correspond to images 20 (FIG. 1) aligned with input regions on a touch screen to produce a function when an object approaches or contacts the images 20. For example, when an object selects the image 20 of an envelope shown in FIG. 1, the device 10 may open an electronic mail application. In other embodiments, the selectable images 188 may correspond to other input features such as arrows that when selected scroll through screens or map locations.

Returning to the comparison block 168, if the data is not within the motion limits 166, the device may display the screen as generated (block 170). No display adjustment will have occurred, resulting in an unmodified screen 172 displaying the selectable images 188. Input regions may then be aligned with the screen (block 174). The method may generate input regions (block 176) contemporaneously to sensing motion (block 162). As illustrated in FIG. 10, the generated input regions 178 may include groups of nodes 102 located on a touch screen positioned in front of or behind the display 16. These input regions 178 may be aligned with the selectable images to produce a display with corresponding input regions 180. Consequently, when the nodes 102 (FIG. 10) within an input region 178 are touched, the device 10 may execute a function corresponding to the selectable image such as scrolling through a screen or opening an application. Once the input regions are aligned with the screen, the device is ready to receive user input (block 182).

Returning to the comparison block 168, the motion limits 166 define a range where display adjustment may occur. As describe above, an unmodified screen 172 is displayed if the motion data is not within the motion limits. However, if the motion data is within the motion limits 166, the method 160 may include determining a display adjustment (block 184). The display adjustment 190 may be determined by analyzing the motion data 164 and the selectable images 188. The amount of motion in conjunction with the proximity of the selectable images may determine the amount of the adjustment. For example, if the motion data 164 represents rapid motion, the display adjustment 190 may increase the size of the selectable images 188. However, the increased size may be limited by the proximity of the selectable images. For example, in some embodiments a maximum size may be set to ensure selectable images do not overlap with other selectable images. This type of adjustment is illustrated in FIG. 10 where the selectable images have been increased in size without overlapping. If the motion data 164 represents less motion that previously sensed, the display adjustment may decrease the size of the selectable images 188 back to their original size. In another example, if the motion data 164 represents a large amount of motion in any direction, the display adjustment 190 also may increase the size of the selectable images 188. In some embodiments, the selectable images may be increased in size to produce a display containing overlapping selectable images that may be apportioned as described below.

Once the display adjustment 190 is determined, the display may be varied (block 192) to present a modified screen with scaled images 194. The input regions 178 may then be scaled to align with the screen (block 196). For example, if the selectable images have been scaled to increase in size, the input regions also may be increased in size a corresponding amount to align with the scaled images. The scaled input regions align with the selectable images to produce a display with corresponding input regions 198.

Once a display with corresponding input regions 198 is produced, the method may determine a display portion (block 200) using apportionment properties 202. The determination of a display portion may result in an apportioned display 204 that contains only a portion of the display with corresponding input regions 198.

The apportionment properties 202 may be used to determine which portion of the display with corresponding input regions 198 appears on the device. For example, the apportionment properties 202 may specify the number of selectable images to display, the proximity of the selectable images to each other, and/or the maximum or minimum size of the selectable images. In one embodiment where the apportionment properties 202 specify the proximity of selectable images to each other, the display portion may include only some of the selectable images in order to maintain a specified distance between the selectable images. This type of apportioned display is illustrated in FIG. 11 where the middle row of selectable images has been omitted.

In other embodiments, the display portion may include only a portion of the screen, such as the top or bottom half of the screen enlarged to occupy the entire display. In some embodiments, the apportionment properties may vary based on the motion data 164. For example, if a large amount of motion is sensed, the maximum size of the selectable images may be increased or the minimum distance required between selectable images may be decreased. In yet other embodiments, the display portion may include the entire display with corresponding input regions 198. For example, if the display with corresponding input regions 198 contains a number of selectable images below a maximum specified number of selectable images, all of the selectable images may be displayed on the apportioned display 204. In this case, the apportioned display 204 may be identical to the display with corresponding input regions 198.

In some embodiments, the apportionment properties 202 may be contained within the display circuit 42, expansion card 34, memory 30, or storage 29 of the device 10, as shown in FIG. 2. The apportionment properties 202 also may be configurable by a user and stored in storage 28 of the device 10. For example, a user may customize the apportionment properties 202 by specifying a maximum or minimum number of selectable images to display. A user also may specify apportionment properties such as the maximum or minimum scaling size of the selectable images or designate a minimum distance required between selectable images.

Once an apportioned display 204 has been produced, the device 10 is ready to receive user input 182. Of course, the method 160 for producing scaled images and an apportioned display may be used in conjunction with the method 65 for producing a motion compensated screen (FIG. 6) and/or the method 110 for producing a motion compensated input region (FIG. 8). For example, the selectable images may be scaled to increase in size using the method 160 illustrated in FIG. 12 and the screen containing the selectable images may be shifted to the right using the method 65 illustrated in FIG. 6. In another example, only some of the selectable images may be displayed using the method 160 illustrated in FIG. 12 and an input region for one of the selectable input regions may be shifted above the selectable image using the method 110 illustrated in FIG. 8 to account for motion of the selection object 106. Of course, any combination of the methods depicted in FIGS. 6, 8, and 12 may be employed to produce a device 10 that responds to various types of user and/or device motion.

Figure 13:
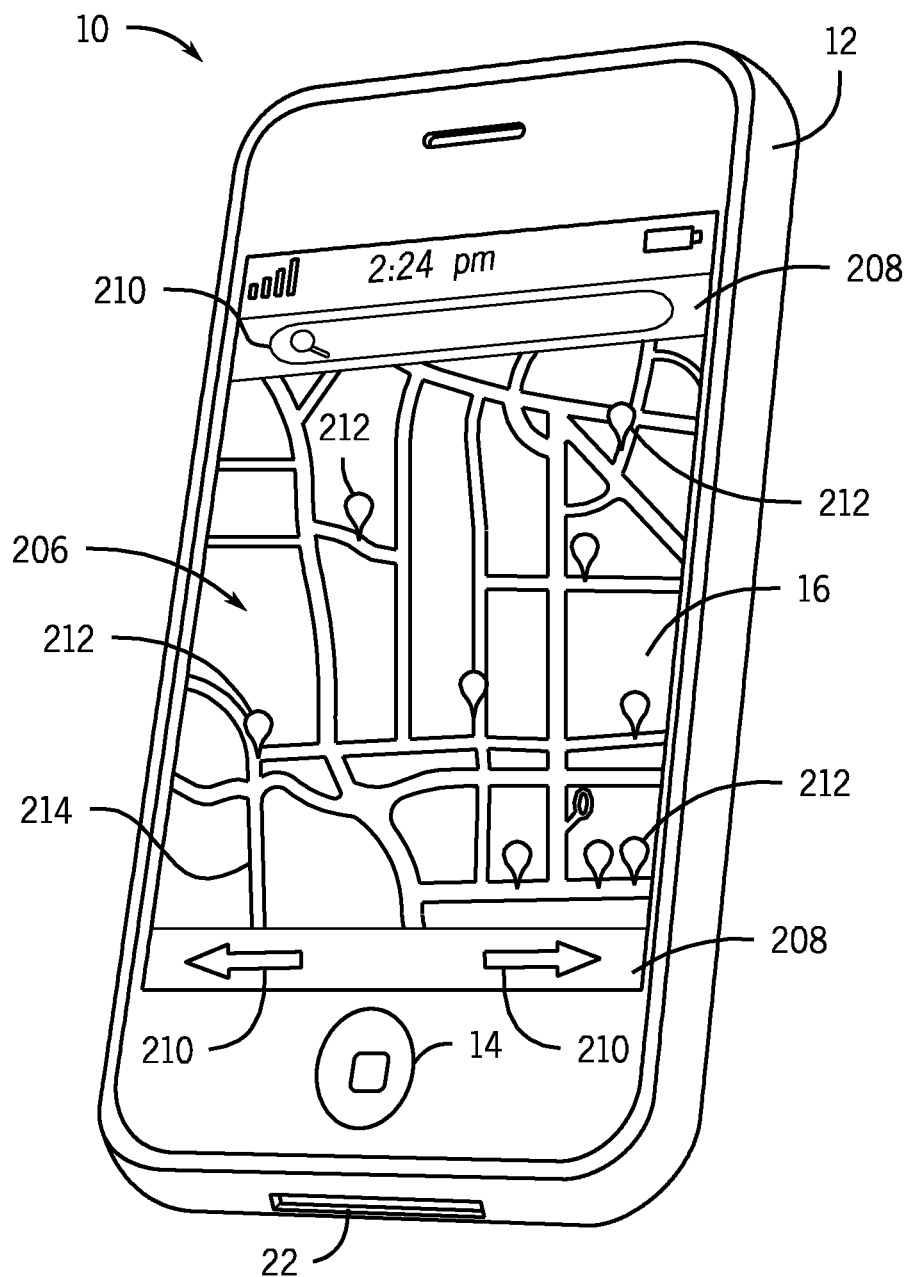
FIG. 13 is a perspective view illustrating the electronic device of FIG. 1 with a map display in accordance with one embodiment of the present invention.

FIG. 13 illustrates another example of the device 10, which may produce scaled selectable images and an apportioned display using method 160 illustrated in FIG. 12. The device 10 includes a screen 206 displaying a map, which may be accessed through an application such as an Internet or pre-programmed map application. In the illustrated embodiment, border areas 208 located at the top and bottom of the screen 206 include selectable input features 210. The input features 210 may include selectable arrows, such as those shown at the bottom of the screen, that allow a user to scroll through multiple screens. The input features 210 also may include an input area, such as the browser bar shown at the top of the screen that allows a user to enter information such as a location to display on the screen 206. For example, a user may enter the term "pizza" in the browser bar to display the location of pizza restaurants on the screen 206. Selectable images 212 displayed on the screen 206 show various selectable locations on the map. For example, the selectable images 212 illustrated in FIG. 13 may represent the locations of pizza restaurants a user may select to view details about each location such as the phone number or website. Input regions (not shown for clarity) may be located behind the selectable images 212 to receive user input. A background 214, shown here as streets, provides context for the selectable images 212 displayed on the screen 206.

Figure 14:
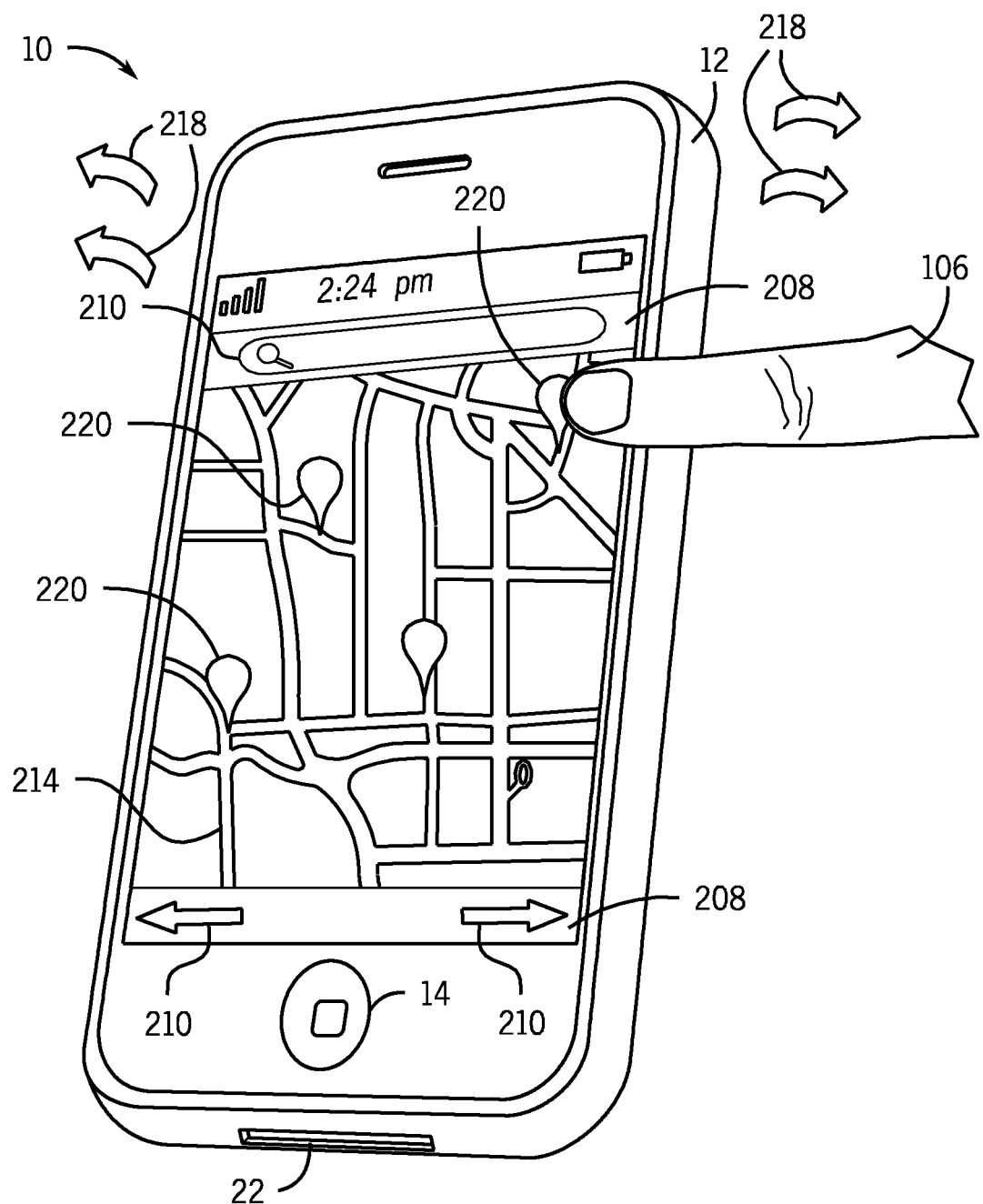
FIG. 14 is a perspective view illustrating the device of FIG. 13 with scaled input regions and an apportioned display in accordance with one embodiment of the present invention.

FIG. 14 depicts the device 10 of FIG. 13 with an apportioned display 216. As illustrated, the device 10 is moving in a side-to-side motion as indicated generally by arrows 218. This motion may be caused by a user or by environmental instability. In response to the motion, the apportioned display 216 contains scaled images 220. These scaled images 220 are larger versions of the selectable images 212 shown in FIG. 13. Additionally, the apportioned display 216 includes scaled versions of only four of the nine selectable images 212 shown in FIG. 13. Various selectable images 212 have been omitted from the apportioned display 216 to facilitate user selection of the scaled images 220. The omission of selectable images 212 may be determined using apportionment properties 202 (FIG. 12). In this embodiment, the background 214 remains unchanged and provides context for the scaled images 220. Although only four of the selectable images 212 are displayed as scaled images 220 on the apportioned display 216, a user may view the omitted selectable images by scrolling through additional screens using the input features 210 or user input structures 14.

Figure 15:
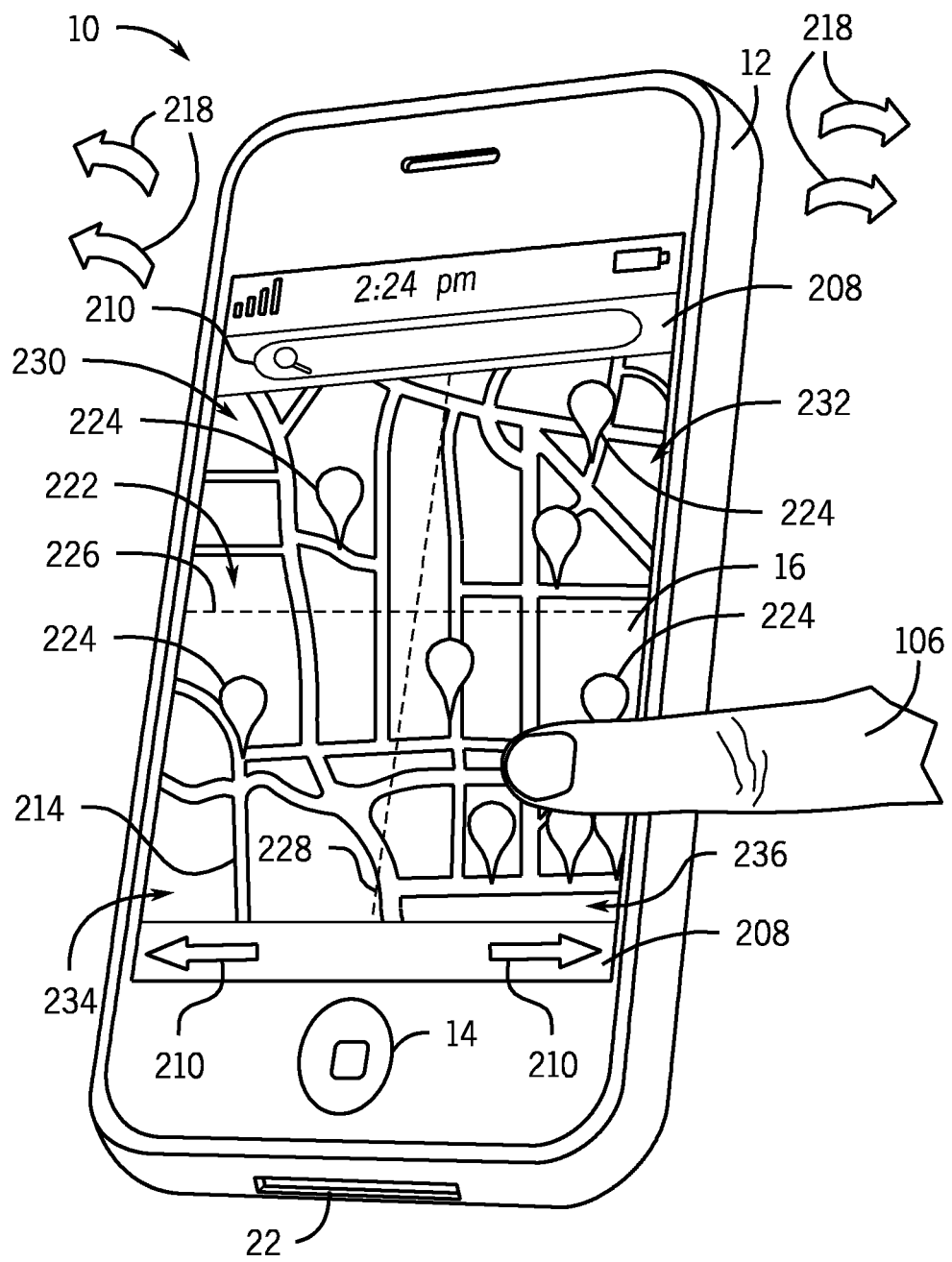
FIG. 15 is a perspective view illustrating the device of FIG. 13 with scaled input regions in accordance with one embodiment of the present invention.

FIG. 15 illustrates an alternative embodiment of the device 10 of FIG. 13 with scaled images 224. All nine of the selectable images 212 are shown in FIG. 15 as scaled images 224. A horizontal dashed line 226 and a vertical dashed line 228 are shown on the display 16 to divide the display into four sections 230, 232, 234, and 236. The number of sections may be determined using apportionment properties 202 (FIG. 12). A selection object 106, shown here as a finger, may be used to select one of the four sections 230, 232, 234, and 236. As illustrated, the selection object is selecting the bottom right section 236.

Figure 16:
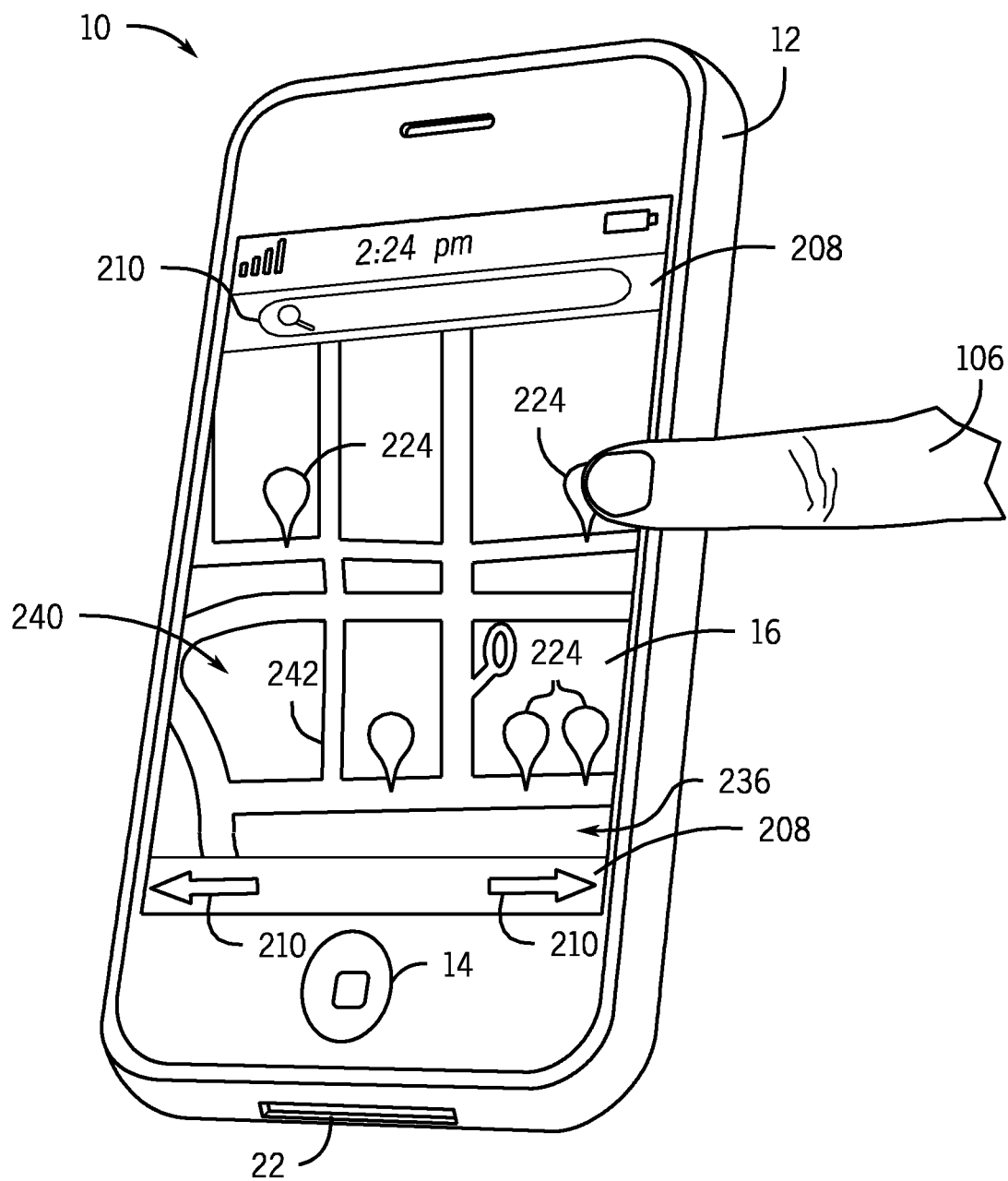
FIG. 16 is a perspective view illustrating the device of FIG. 15 with an apportioned display in accordance with one embodiment of the present invention.

Upon selection of a section 230, 232, 234, or 236 the device 10 may display an enlarged version of the section on the display 16. FIG. 16 illustrates the device 10 with a screen 240 displaying an enlarged version of section 236. As shown, section 236 has been enlarged to occupy the entire display 16. Due to the enlargement of section 236, the scaled images 224 are farther apart from each other facilitating selection of the scaled images 224. The background 242, which provides context for the scaled images 224, has also been enlarged. In other embodiments where the background does not provide context, such as screens showing only selectable icons, the background may not be scaled along with the images. Additionally, although the scaled images 224 are the same size as shown in FIG. 15, in other embodiments, the scaled images 224 may be further enlarged when a section 230, 232, 234, or 236 is selected. The size of the scaled images 224 may be determined using motion data 164 (FIG. 12). Again, input features 210 may be used to navigate through the sections 230, 232, and 234 not currently shown on the display 16.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method, comprising:
   at a multifunction device with a touch screen display:
   displaying an icon image at a first location on the touch screen display, the icon image having an associated touch screen input region with a predetermined size at a second location;
   detecting motion data that is acquired by detecting a series of contacts of a selection object on the touch screen display;
   determining that the motion data is within predetermined limits; and
   in response to detecting the motion data and determining that the motion data is within predetermined limits, moving the touch screen input region associated with the image icon to a third location while maintaining display of the icon image at the first location and maintaining the predetermined size of the touch screen input region.

2. The method of claim 1, wherein the contact data comprises proximity data.

3. A portable electronic device, comprising:
   a touch screen display;
   one or more processors;
   memory; and
   one or more programs, wherein the one or more programs are stored in the memory and configured to be executed by the one or more processors, the one or more programs including instructions for:
   displaying an icon image at a first location on the touch screen display, the icon image having an associated touch screen input region with a predetermined size at a second location;
   detecting motion data that is acquired by detecting a series of contacts of a selection object on the touch screen display;
   determining that the motion data is within predetermined limits; and
   in response to detecting the motion data and determining that the motion data is within predetermined limits, moving the touch screen input region associated with the image icon to a third location while maintaining display of the icon image at the first location and maintaining the predetermined size of the touch screen input region.

4. The device of claim 3, wherein the contact data comprises proximity data.

5. A non-transitory computer readable storage medium storing one or more programs, the one or more programs comprising instructions, which when executed by a portable electronic device with a touch screen display, cause the device to:
   display an icon image at a first location on the touch screen display, the icon image having an associated touch screen input region with a predetermined size at a second location;
   detect motion data that is acquired by detecting a series of contacts of a selection object on the touch screen display;
   determine that the motion data is within predetermined limits; and
   in response to detecting the motion data associated and determining that the motion data is within predetermined limits, move the touch screen input region associated with the image icon to a third location while maintaining display of the icon image at the first location and maintaining the predetermined size of the touch screen input region.

6. The non-transitory computer readable storage medium of claim 5, wherein the contact data comprises proximity data.

* * * * *

UNITED STATES PATENT AND TRADEMARK OFFICE
CERTIFICATE OF CORRECTION

| | |
|---|---|
| PATENT NO. | : 8,681,093 B2 |
| APPLICATION NO. | : 12/029336 |
| DATED | : March 25, 2014 |
| INVENTOR(S) | : Lee et al. |

It is certified that error appears in the above-identified patent and that said Letters Patent is hereby corrected as shown below:

In the Claims

Column 18, line 61, claim 5, after "data" delete "associated".

Signed and Sealed this
Seventh Day of October, 2014

Michelle K. Lee
*Deputy Director of the United States Patent and Trademark Office*